United States Patent
Uenoyama et al.

(10) Patent No.: US 6,421,385 B1
(45) Date of Patent: Jul. 16, 2002

(54) APPARATUS AND METHOD FOR EFFICIENT CONVERSION OF DV (DIGITAL VIDEO) FORMAT ENCODED VIDEO DATA INTO MPEG FORMAT ENCODED VIDEO DATA BY UTILIZING MOTION FLAG INFORMATION CONTAINED IN THE DV DATA

(75) Inventors: Tsutomu Uenoyama, Kawasaki; Daisaku Komiya, Tokyo, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/164,334

(22) Filed: Oct. 1, 1998

(30) Foreign Application Priority Data

Oct. 1, 1997 (JP) .............................. 9-283164

(51) Int. Cl.$^7$ ................................ H04N 7/30
(52) U.S. Cl. ................................ 375/240.2
(58) Field of Search ................ 375/240.01, 240.03, 375/240.04, 240.12–240.16, 240.18, 240.2, 240.24; 382/232, 236, 248, 250; 348/441, 446, 451, 452; 386/33, 46, 109, 111, 112; H04N 7/30

(56) References Cited

U.S. PATENT DOCUMENTS

| | | | |
|---|---|---|---|
| 5,374,958 A | * 12/1994 | Yanagihara | 375/240.04 |
| 5,677,734 A | * 10/1997 | Oikawa et al. | 375/240.24 |
| 5,721,588 A | * 2/1998 | Fujiwara et al. | 375/240.15 |
| 5,760,835 A | * 6/1998 | Fujiwara et al. | 375/240.15 |
| 5,801,777 A | * 9/1998 | Lyu | 375/240.2 |
| 6,057,884 A | * 5/2000 | Chen et al. | 375/240.16 |
| 6,128,047 A | * 10/2000 | Chang et al. | 375/240.16 |
| 6,141,447 A | * 10/2000 | Linzer et al. | 382/236 |
| 6,188,725 B1 | * 2/2001 | Sugiyama | 375/240.12 |

FOREIGN PATENT DOCUMENTS

| | | |
|---|---|---|
| EP | 0 695 097 A | 1/1996 |
| EP | 0 697 792 A | 2/1996 |
| JP | 7-322268 | 12/1995 |
| JP | 8-46971 | 2/1996 |
| WO | WO 97 13371 A | 4/1997 |

OTHER PUBLICATIONS

Information technology—Coding of moving pictures and associted audio for digital storage media at up to about 1,5 Mbit/s—Part:2 Video; ISO/IEC 11172–2:1993(E); pp., 1–9.

(List continued on next page.)

Primary Examiner—Richard Lee
(74) Attorney, Agent, or Firm—Loew Hauptman Gilman & Berner, LLP

(57) ABSTRACT

A video signal conversion apparatus converts DV-format encoded compressed video data to MPEG format data, by utilizing motion flag information contained in the DV data which specifies for each of respective DCT blocks whether interlaced-frame mode DCT processing or progressive-field mode DCT processing has been applied to the block when executing DV encoding. The motion flag information can be used by a procesing mode selection section to determine various MPEG encoding modes to be applied in units of MPEG macroblocks, such as selecting respective macroblocks to be subjected to interlaced-frame mode DCT processing by an orthogonal transform processing section when the set of motion flags corresponding to the blocks constituting that macroblock are judged to indicate no substantial amount of motion for the macroblock, and to select progressive-field mode DCT processing when a substantial amount of motion is judged to exist. The amount of MPEG processing can thereby be readily reduced, without deterioration of image quality.

22 Claims, 13 Drawing Sheets

OTHER PUBLICATIONS

Information technology –Genetic coding of moving pictures and associated audio information: Video; ISO–IEC 13818–2:1996(E); pp., 5–9.

" ISO/IEC CD 13818–: Information technology—Generic coding of moving pictures and associated audio information part 2:video" International Standard, CH, Zuerich, No. 659, Dec. 1, 1993, pp. A–C, I–vii, 1–57, XP002159806.

Yanbin Yu et al.: "Interlocked video coding with field–based multiresolution representation" signal processing. Image communication, NL, Elsevier Science Publishers, Amsterdam, vol. 5, No. 1/02, Feb. 1, 1993 pp. 185–198 XP000345620 ISSN: 0923–5965 Sections 1.–3.

Wei B W et al.: " Video coding for HDTV systems" Proceedings of the annual International Computer Software and Applications Conference(COMPSAC), US, Los Alamitos, IEEE Comp. Soc, Press, vol. Conf. 18, Nov. 9, 1994, pp. 469–475, XP 000531343 ISBN: 0–8186–6707–9 Section "Prediction modes".

Uchida H et al.: "DVCPRO: A Comprehensive format overview" SMPTE Journal, US, SMPTE Inc. Scarsdale, N.Y. vo. 105, No. 7, Jul. 1, 1996 pp. 406–418, XP000597144 ISSN:0036–1682 Section " Video signal processing".

Hasegawa K. et al.: "Low–power video encoder/decoder chip set for digital VCR's" IEEE Journal of solid–state circuits, US, IEEE Inc. New York vol. 31, No. 11, Nov. 1, 1996, pp. 1780–1788, XP000691463 ISSN: 0018–9200 Sections II. B, II. D., III, B.

With DE P H N et al.: " Design considerations of the video compression system of the new DV camcorder standard" IEEE transactions on comsumer electronics, US, IEEE Inc. New York, vol. 43, No. 4, Nov. 1, 1997, pp. 1160–1179, XP000768571 ISSN; 0098–3063 Section6.

Peak S–K et al.: " A mode–changable 2–D DCT/IDCT Processor for digital VCR" IEEE Transactions on Consumer Electronics, vol. 42, No. 3, Aug. 1996, pp. 606–616, XP002159807 Sections I. C., V.A.

* cited by examiner

FIG. 3
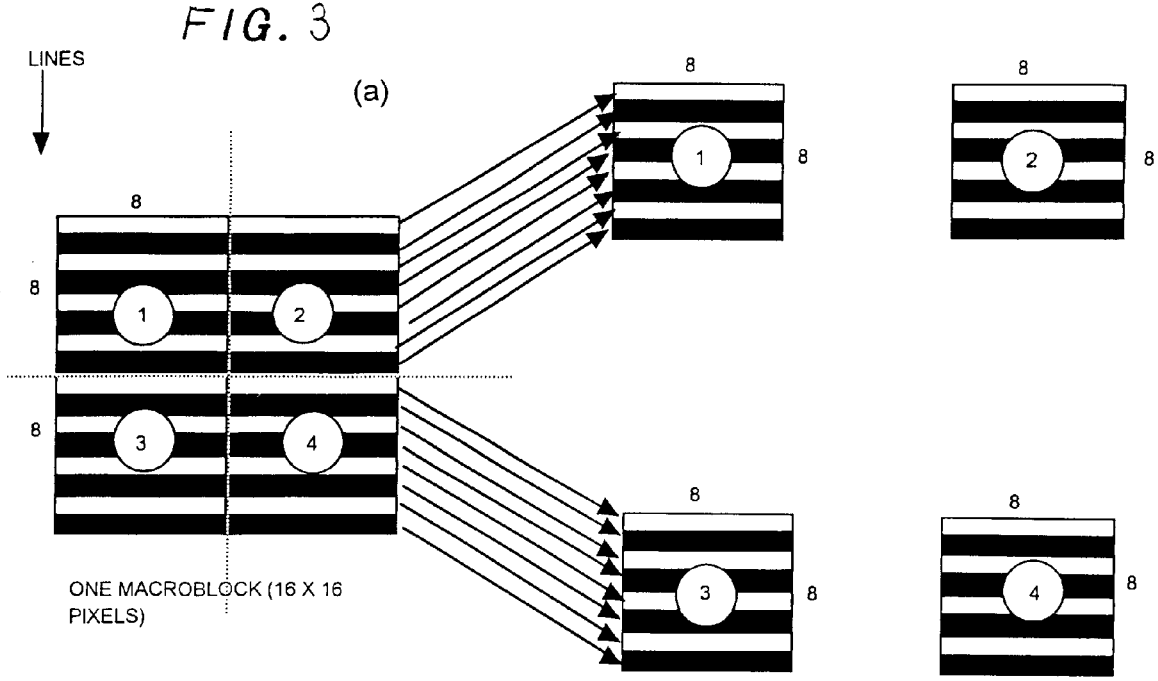
(a)
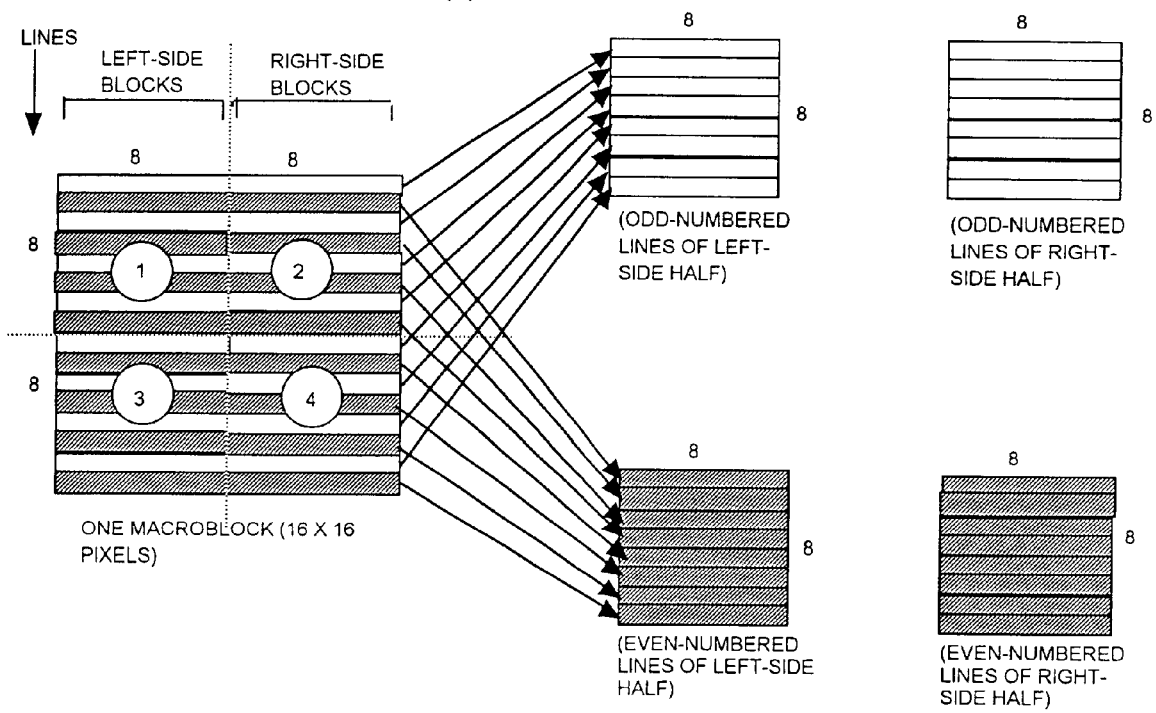
(b)

FIG. 8
(a)
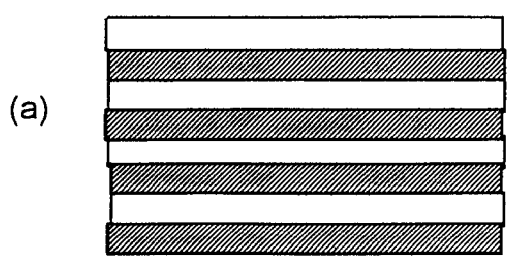
FRAME
(b)
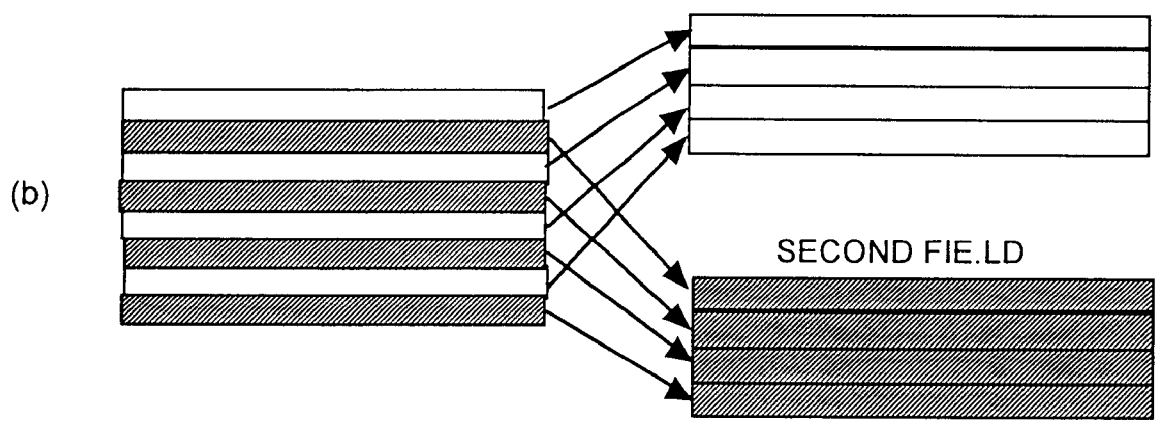
FIRST FIELD
SECOND FIELD

FIG. 10
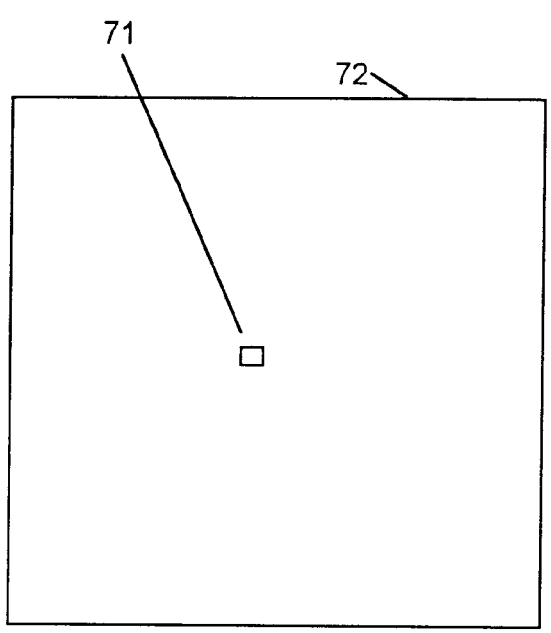
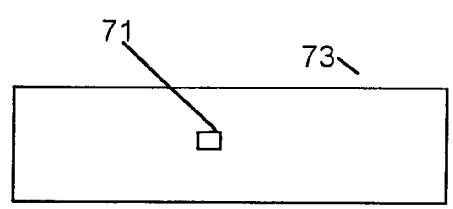
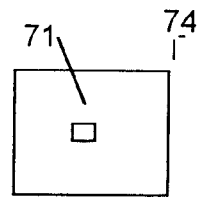

FIG. 12
(PRIOR ART)
(a) 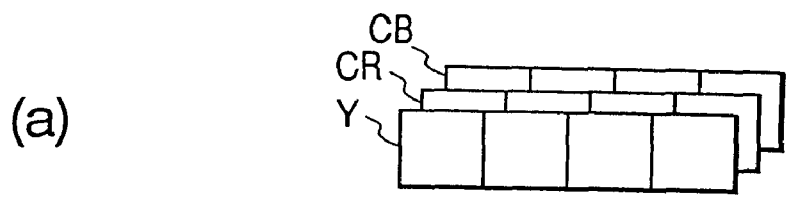
(b) 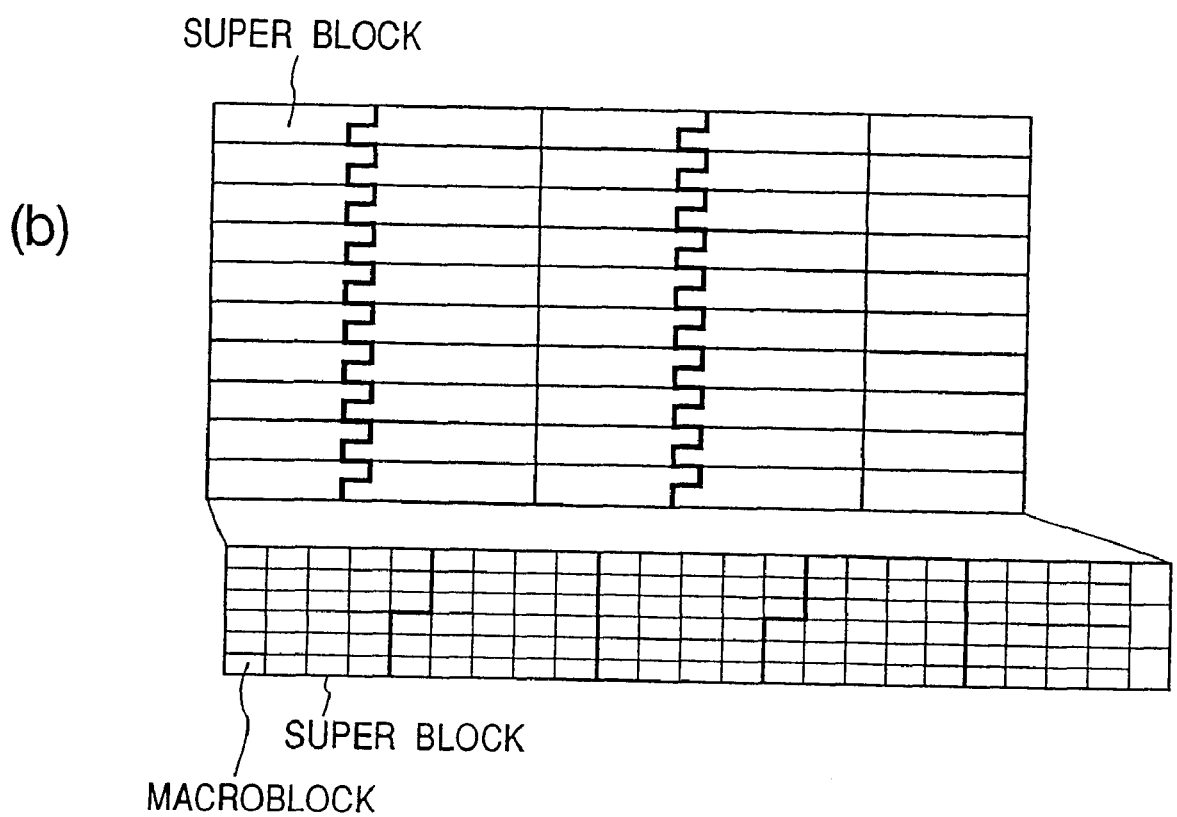

FIG. 13
(PRIOR ART)
(a) PICTURE
(b) SLICE
(c) MACROBLOCK CB CR
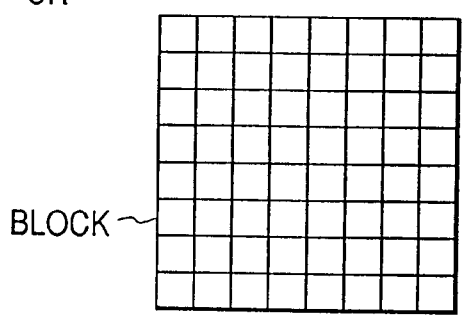
(d) BLOCK
(e)
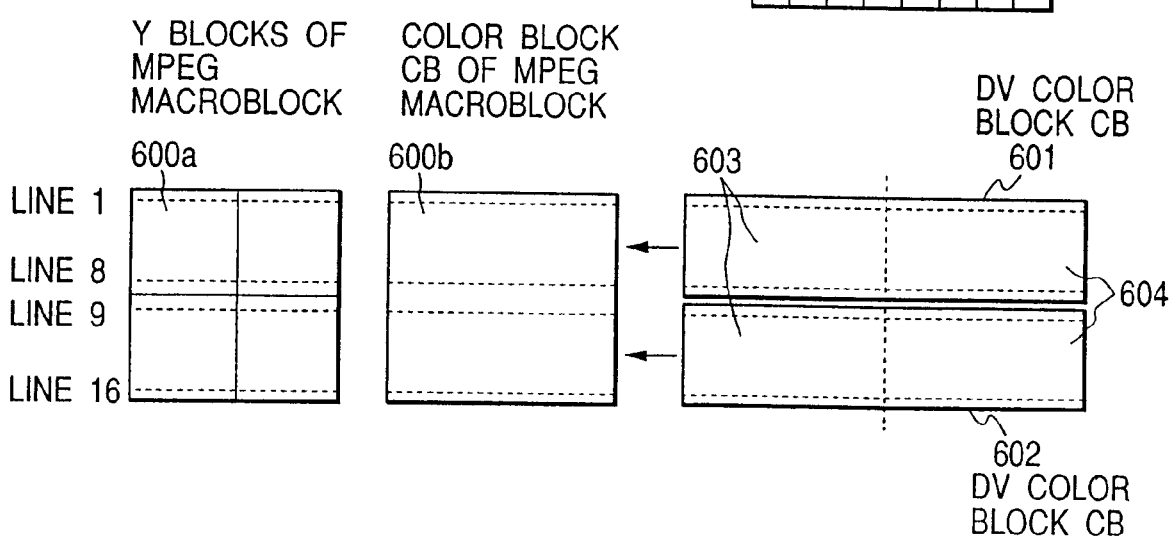

APPARATUS AND METHOD FOR EFFICIENT CONVERSION OF DV (DIGITAL VIDEO) FORMAT ENCODED VIDEO DATA INTO MPEG FORMAT ENCODED VIDEO DATA BY UTILIZING MOTION FLAG INFORMATION CONTAINED IN THE DV DATA

BACKGROUND OF THE INVENTION

1. Field of the Invention

The present invention relates to an apparatus for video signal conversion, and to a corresponding video signal conversion method, for converting a compressed digital video signal into a compressed digital video signal in a different compression format. In particular, the invention relates to a method and apparatus whereby motion flags which are contained in the compressed digital video signal prior to conversion are effectively utilized for converting the video signal.

2. Description of the Prior Art

In recent years, with the increasing popularity of multimedia, considerable research has been executed in various directions for video on-demand systems, whereby video images can be viewed from a television receiver or a personal computer whenever desired.

A group which includes the assignees of the present invention has developed and put into practical application a system, for use as a video on-demand system, whereby images which are acquired by a digital video camera are edited and then converted to a compressed format digital video signal, to be distributed to personal computers etc.

In general, a digital video camera records a compressed digital video signal in the DV format, which is a standard that has been established for digital video equipment. The DV format was established as a standard in 1996, for application to video cassette recorders, based on the "Specifications of Consumer-Use Digital VCRs" (HD Digital VCR Conference, 1996), whereby image compression is achieved by a combination of DCT (Discrete Cosine Transform) processing to reduce spatial image redundancy within each frame of a digital video signal and variable-length encoding to reduce code redundancy.

With video data in accordance with the DV format, as shown in diagram (a) of FIG. 12, one macroblock of a video signal frame consists of four luminance signal blocks which are arrayed along the horizontal direction as an elongated rectangular array, with each luminance signal block consisting of an array of 8×8 pixel values, and two color difference signal blocks (CR, CB) which, in a finally displayed picture each correspond in size and position to the set of four luminance signal blocks, with this arrangement of pixel values within a frame being referred to as the 4:1:1 color component format. Also, as shown in diagram (b) of FIG. 12, 27 of these macroblocks constitute a super block, with a 5×10 set of the super blocks constituting one complete frame of the digital video signal.

A DV format video camera outputs video information in units of interlaced fields, with a 1/60 second period between successive fields. When the amount of image motion within a frame is small, then each frame is formed by combining two successive fields, so that the frame period is 1/30 second, and DCT processing is applied to each of such frames as an interlaced combination of two fields, with such processing being referred to as interlaced-field mode DCT processing. On the other hand, when the image motion within a frame is large, then the frame is processed as two successive fields, i.e., DCT processing is separately applied to each of the two fields of that frame, with such processing being referred to in the following as as progressive-field mode DCT processing. Since it is possible that image motion may occur within only a limited region, the selection of frame DCT mode or field DCT mode is executed adaptively in units of blocks of a frame. When DCT processing is applied to each of the four luminance signal blocks and two color difference signal blocks of a macroblock, respective motion flags corresponding to these six blocks are inserted into the code which is generated by compressing the digital video signal, with these motion vectors respectively indicating for each block whether field DCT mode or frame DCT mode has been applied to that block. A motion flag takes the logic value "1" if the amount of motion detected for the corresponding block is large, so that progressive-field mode DCT processing has been assigned to the block, and takes the value "0" if the amount of motion detected for the corresponding block is small, so that interlaced-frame mode DCT processing has been assigned to the block. These motion flags are subsequently referred to when decoding the compressed DV format digital video signal.

In order to distribute digital video data that has been compressed in accordance with the DV standard, to personal computers, etc., it is necessary to convert the video data to the MPEG-1 or MPEG-2 compressed code format. This conversion is generally executed by decoding the DV standard video data to recover a non-compressed video signal consisting of successive frames, and then applying compression processing in accordance with the MPEG standard to the non-compressed digital video signal.

The MPEG-1 or MPEG-2 compression standards are widely applied to video signals which are to be processed by personal computers. Each of these is a standard whereby spatial image redundancy within each frame is reduced by applying DCT transform processing, then applying variable-length encoding to reduce code redundancy. In addition, inter-frame redundancy is reduced by applying motion compensation. For that reason, the amount of code which is generated by MPEG compression encoding is reduced to 1/6 of the amount of that is generated by DV compression encoding, so that the MPEG code can easily be transmitted via a network.

MPEG-1 is described in detail in IOS/IEC 11172-2 "Information technology—Coding of moving pictures and associated audio for digital storage media at up to about 1.5 Mbit/s—Part 2: Video", while MPEG-2 is described in IOS/IEC 13818-2 "Information technology—Generic coding of moving pictures and associated audio information—Part 2: Video"

With MPEG format video data, as shown in diagram (c) of FIG. 13, one macroblock is formed of four luminance signal blocks (each formed of 8×8 pixel values) arranged in a square array, and two color difference signal blocks (CR, CB) which correspond in position to the set of four luminance signal blocks, with this being referred to as the 4:2:0 color component format. In terms of respective amounts of data, since each color difference signal block consists of 8×8 pixel values it is equivalent to one luminance signal block, however in terms of a finally displayed picture (after interpolation of color difference values), each color difference signal block of a macroblock corresponds in size and position to the set of four luminance signal blocks of that macroblock. A set of macroblocks arrayed along the horizontal scanning direction of a frame constitutes one slice, as shown in diagram (b), with a plurality of slices constituting one picture, as shown in diagram (a).

With MPEG encoding, intra-coding (i.e. direct conversion to sets of DCT coefficients) or inter-coding (i.e., motion prediction encoding, and conversion of resultant prediction error values to DCT coefficients) of the digital video signal may be applied.

With the MPEG-1 method, encoding in units of fields is not executed. This enables the processing speed to be high, however since a period of 1/60 second occurs between the times at which the respective images of two successive fields are captured by a video camera, when these two fields are combined into a single field-interlaced frame and such a frame is directly encoded, deterioration of the resultant reproduced image quality will occur whenever there is rapid motion within the image expressed by a frame.

This problem is reduced with the MPEG-2 encoding method. In that case, progressive-field mode encoding or interlaced-field mode encoding can be adaptively selected. With progressive-field mode encoding applied to an entire frame, the two fields constituting the frame are separated, and the entire contents of each field are separately encoded (by intra-coding or inter-coding). Alternatively, only certain macroblocks of the frame can be adaptively selected to be encoded in progressive-field mode.

However progressive-field mode processing results in a greater amount of code being generated than is generated with interlaced-field mode encoding, so that the processing speed becomes lower. For that reason, with MPEG-2, progressive-field mode encoding is adaptively applied only to image regions in which there is a large amount of motion, with emphasis being placed on minimizing the amount of processing which must be performed, consistent with satisfactory image quality.

A prior art method of selecting the image regions to which progressive-field mode is to be applied is described for example in Japanese patent HEI 8-46971. With that method, a single non-compressed frame is separated into its two fields, and motion prediction is then applied between respective macroblocks of the first and second field images. Motion vectors are thereby obtained for the respective macroblocks, and depending upon the magnitudes of the corresponding motion vectors, either progressive-field mode or interlaced-field mode encoding is adaptively assigned to the macroblocks.

Furthermore, as described in Japanese patent HEI 7-322268, the motion vectors which are thereby detected between two successive fields of a frame for the purpose of field or interlaced-field mode encoding determination, can be used in calculating inter-frame motion vectors, in order to achieve an improvement in encoding efficiency.

However with such types of mode selection method, in order to adaptively select progressive-field mode or interlaced-field mode encoding for a frame, it is necessary to perform motion prediction over the entire frame. For that reason, the amount of processing which is required becomes considerable, and the processing time is accordingly increased. If such processing were to be executed by using dedicated hardware, then the necessary circuit size would necessarily be increased.

SUMMARY OF THE INVENTION

It is an objective of the present invention to overcome the above problems by providing a video signal conversion apparatus whereby a digital video signal that has been encoded by DV format compression is converted to a digital video signal encoded by MPEG format compression, and whereby motion flags which are contained in the DV format data are used to achieve efficient conversion to the MPEG format code, and further to provide a corresponding video signal conversion method.

It should be understood that, unless otherwise indicated, the term "macroblock" as used in the following description and in the appended claims is intended to signify an MPEG format macroblock.

To achieve the above objectives the present invention provides a video signal conversion apparatus and corresponding method whereby, after decoding of video data which has been encoded in the DV format, the resultant non-compressed digital video signal is encoded as MPEG format data, with motion flag information expressed by motion flags contained in the DV format data being used to select between different MPEG encoding modes, in one or more of the following ways. Firstly, the motion flag information may be used to adaptively select interlaced-field mode DCT processing or progressive-field mode DCT processing in units of macroblocks. That is to say, the apparatus judges based upon the motion flag information corresponding to a macroblock of an interlaced-field frame of the input non-compressed video signal whether or not there is a significant amount of motion associated with that macroblock. If it is judged that there is not a significant amount of motion, indicating that the macroblock contents have not change significantly between the two successive fields of the frame, then interlaced-field mode DCT processing is assigned to that macroblock, i.e. the macroblock is directly DCT-processed. If however is judged that there is a significant amount of motion, then progressive-field mode DCT processing is assigned for the macroblock, i.e. the two interlaced portions of that macroblock which are contained in the first and second fields of the frame respectively, are DCT-processed mutually separately.

Secondly, the motion flag information may be used to adaptively select interlaced-field mode motion prediction processing or progressive-field mode motion prediction processing in units of macroblocks, i.e. for each macroblock which is to be inter-coded. In this case, if it is judged based on the corresponding motion flag information that there is not a significant amount of motion associated with the macroblock, then interlaced-field mode motion prediction processing is assigned to that macroblock, i.e. the macroblock is directly subjected to motion prediction processing by comparison with successive macroblocks of a reference frame, within a predetermined search range. If however is judged that there is a significant amount of motion, then progressive-field mode motion prediction processing is assigned for the macroblock. In that case, the portion of the macroblock contained in the first field of the frame is compared with the first field of the reference frame, to obtain a first set of prediction error values and first motion flag, then the same process is performed for the portion of the macroblock contained in the second field. In that case, two motion vectors and two sets of prediction error values are derived for the macroblock.

Thirdly, the motion flag information may be used to adaptively select interlaced-field mode MPEG processing or progressive-field mode MPEG processing in units of pictures, i.e. entire frames or fields. Specifically a frame which is to be encoded is judged, based on the motion flag information that is provided by the entire set of motion flags corresponding to that frame, as to whether the frame contains a significant degree of image motion. If no such degree of motion is found, then the frame is subjected to the usual form of interlaced-field mode MPEG processing. If significant motion is found, then the frame is separated into its first and second constituent fields, which are then successively subjected to independent MPEG encoding.

Fourthly, the motion flag information may be used to adaptively select the search range which is used in motion prediction processing of each of respective macroblocks which are to be subjected to inter-coding. For example, changeover between a relatively wide search range within a reference frame and a relatively narrow range can be executed based upon a judgement as to whether the states of the set of motion flags corresponding to that macroblock indicate a significant degree of motion for the macroblock. If the amount of motion is sufficiently small, then accurate motion prediction can be achieved by using the narrow search range, thereby achieving a substantial reduction in the amount of processing which must be executed. If a large amount of motion is indicated for that macroblock by the motion flag data, then the wide search range is selected. It can thereby be ensured that sufficient accuracy of motion prediction is maintained while minimizing the amount of processing that must be executed to perform motion prediction processing.

More specifically, the present invention provides a video signal conversion apparatus for converting DV encoded video data to MPEG encoded video data, the DV data including motion flag data which specify for each of respective video data blocks whether interlaced-field mode DCT processing or progressive-field DCT processing has been applied in encoding that block, the apparatus comprising:

video decoding means for decoding the DV encoded video data and for extracting the motion flag data from the DV encoded video data to obtain decoded video data formed of a stream of interlaced-field frames, and video encoding means coupled to receive the decoded video data and the motion flag data, for executing MPEG format encoding of the decoded video data, wherein the video encoding means includes processing mode selection means responsive to the motion flag data for adaptively selecting a mode of the MPEG format encoding, based upon the motion flag data.

The video encoding means includes DCT processing means, and the processing mode selection means can comprise means for selectively designating progressive-field mode DCT (Discrete Cosine Transform) processing by the DCT processing means for a macroblock extracted from a frame of the decoded video data when it is judged from the motion flag data that the macroblock exhibits a relatively large amount of motion and designating interlaced-field mode DCT processing for the macroblock when it is judged from the motion flag data that the macroblock exhibits a relatively small amount of motion Specifically, the processing mode selection means can comprise:

macroblock extraction means coupled to receive the decoded video data, for extracting successive macroblocks from each of the frames, interlaced-field mode DCT block extraction means for receiving and directly outputting each macroblock which is extracted by the macroblock extraction means progressive-field mode DCT block extraction means for receiving each macroblock which is extracted by the macroblock extraction means, separating each of the macroblocks into two half-macroblocks which are contained in a first field and in a second field of the each frame, respectively, and successively outputting the half-macroblocks, and means controlled by the processing mode selection means for selecting each of the macroblocks of the decoded video data to be transferred directly by the interlaced-field mode DCT block extraction means to the DCT processing means for application of interlaced-field mode DCT processing when it is judged from the motion flag data that the macroblock exhibits a relatively small amount of motion, or to be transferred as successive half-blocks from the progressive-field mode DCT block extraction means to the DCT processing means for application of progressive-field mode DCT processing, when it is judged from the motion flag data that the macroblock exhibits a relatively large amount of motion.

In addition, the video encoding means of such a video signal conversion apparatus includes motion prediction processing means, and the processing mode selection means can comprise means for selectively applying progressive-field mode motion prediction processing by the motion prediction means to a macroblock extracted from a frame of the decoded video data when it is judged from the motion flag data that the macroblock exhibits a relatively large amount of motion and for applying interlaced-field mode motion prediction processing to the macroblock when it is judged from the motion flag data that the macroblock exhibits a relatively small amount of motion.

Such a video encoding means includes video memory means for storing reconstructed video data frames which have been reconstructed from encoded video data, motion search means and prediction error derivation means, and the processing mode selection means can comprise:

interlaced-field mode reference picture extraction means for obtaining from the video memory means a reconstructed frame for use as a reference frame, and for directly outputting the reference frame, progressive-field mode reference picture extraction means for obtaining from the video memory means a reconstructed frame for use as a reference frame, and for separating the frame into first and second fields, and sequentially outputting the first and second fields, interlaced-field mode object macroblock extraction means for directly extracting successive macroblocks from a frame of the decoded video data, and for outputting the directly extracted macroblocks, progressive-field mode object macroblock extraction means for extracting successive macroblocks from a frame of the decoded video data, and for separating each of the macroblocks into a first half-macroblock which is contained in a first field of the frame and a second half-macroblock which is contained in a second field of the frame, and for successively outputting the first and second half-macroblocks, and prediction mode control means for selecting a directly output reference frame which is produced from the interlaced-field mode reference picture extraction means and a directly extracted macroblock which is produced from the interlaced-frame mode object macroblock extraction means, to be supplied to the motion search means and the prediction error derivation means for applying interlaced-field mode motion prediction processing to the macroblock, when it is judged from the motion flag data that the macroblock exhibits a relatively small amount of motion, and for selecting a successive pair of fields of a reference frame which are produced from the progressive-field mode reference picture extraction means and a successive pair of half-blocks of an extracted macroblock which are produced from the field mode object macroblock extraction means, to be supplied to the motion search means and the prediction error derivation means for applying motion prediction processing to the macroblock, when it is judged from the motion flag data that the macroblock exhibits a relatively large amount of motion.

From another aspect, the mode selection means of such a video signal conversion apparatus can be configured to select, for each of successive frames of the decoded video data, interlaced-field mode DCT processing and motion prediction processing when it is judged from the motion flag data that the image contents of the frame exhibit a large amount of motion and progressive-field mode DCT processing and motion prediction processing when it is judged from the motion flag data that the image contents of the frame exhibit a small amount of motion.

In that case, the mode selection means can comprise picture formation means coupled to receive the decoded video data and controlled by the processing mode selection means for outputting each interlaced-field frame of the decoded video data unchanged, to be subjected to interlaced-field mode DCT processing and motion prediction processing, when it is judged from the motion flag data that the interlaced-field frame exhibits a small amount of motion and for outputting the each interlaced-field frame as two consecutive fields, to be subjected to progressive-field mode DCT processing and motion prediction processing, when it is judged from the motion flag data that the interlaced-field frame exhibits a relatively large amount of motion.

According to another aspect, the video encoding means includes motion prediction processing means having motion search means for comparing a macroblock extracted from a frame of the decoded video data with successive macroblocks of a reference frame within a specific search range in the reference frame, and the processing mode selection means comprises search range control means for operating on the motion search means to set the search range as a narrow range when it is judged from the motion flag data that the macroblock exhibits a relatively small amount of motion and to set the search range as a wide range when it is judged from the motion flag data that the macroblock exhibits a relatively large amount of motion.

According to a further aspect, the invention provides a video signal conversion apparatus wherein the video encoding means includes means for applying intra-coding and means for applying inter-coding to respective video data macroblocks, and wherein the processing mode selection means comprises means for transferring a macroblock of an interlaced-field frame of the decoded video data to be subjected to intra-coding when it is judged from the motion flag data that the macroblock exhibits a relatively large amount of motion, and for transferring the macroblock to be subjected to inter-coding when it is judged from the motion flag data that the macroblock exhibits a relatively small amount of motion.

With a video signal conversion apparatus according to the present invention, the processing mode selection means can judge whether a macroblock exhibits a large or a small degree of motion based upon the states of respective motion flags of luminance signal blocks of the macroblock. Alternatively, the processing selection means can judge that a macroblock exhibits a large amount of motion when at least a predetermined number of respective motion flags of luminance signal blocks of the macroblock each indicate a condition of large amount of motion. As a further alternative, the processing mode selection means can judge that a macroblock exhibits a small amount of motion when at least one of two color difference signal blocks in the macroblock indicates a condition of small amount of motion. And as yet another possible standard for judgement, the processing mode selection means can judge that a macroblock exhibits a large amount of motion when at least a predetermined number of respective motion flags of four luminance signal blocks of the macroblock and also at least one of two color difference signal blocks of the macroblock each indicates a condition of large amount of motion.

The invention further provides a method of converting DV encoded video data to MPEG encoded video data, the DV data consisting of digital video data which have been encoded in a DV format and including motion flag data which specify for each of respective video data blocks a DCT processing mode which has been applied in DV encoding of the block, whether interlaced-field mode DCT processing or progressive-field DCT processing has been applied in encoding that block, the method comprising:

decoding the DV encoded video data to obtain decoded video data formed of a stream of interlaced-field frames, and extracting the motion flag data from the DV encoded video data, and executing MPEG format encoding of the decoded video data, by adaptively selecting a mode of the MPEG format encoding, based upon a judgement of the motion flag data.

BRIEF DESCRIPTION OF THE DRAWINGS

FIG. 3 conceptually illustrates separation of a macroblock into respective blocks, for the purpose of interlaced-field mode and progressive-field mod DCT processing respectively;

FIG. 8 illustrates the respective configurations of an interlaced-field mode picture and progressive-field mode pictures, which are adaptively selected for MPEG processing based on motion flag data, with the embodiment of FIG. 7;

FIG. 10 conceptually illustrates examples of search ranges which can be set by the embodiment of FIG. 9;

FIG. 12 illustrates the basic structure of DV format macroblocks and super blocks; and FIG. 13 illustrates the basic structure of MPEG format macroblocks and frames.

DESCRIPTION OF PREFERRED EMBODIMENTS

First Embodiment

Figure 1:
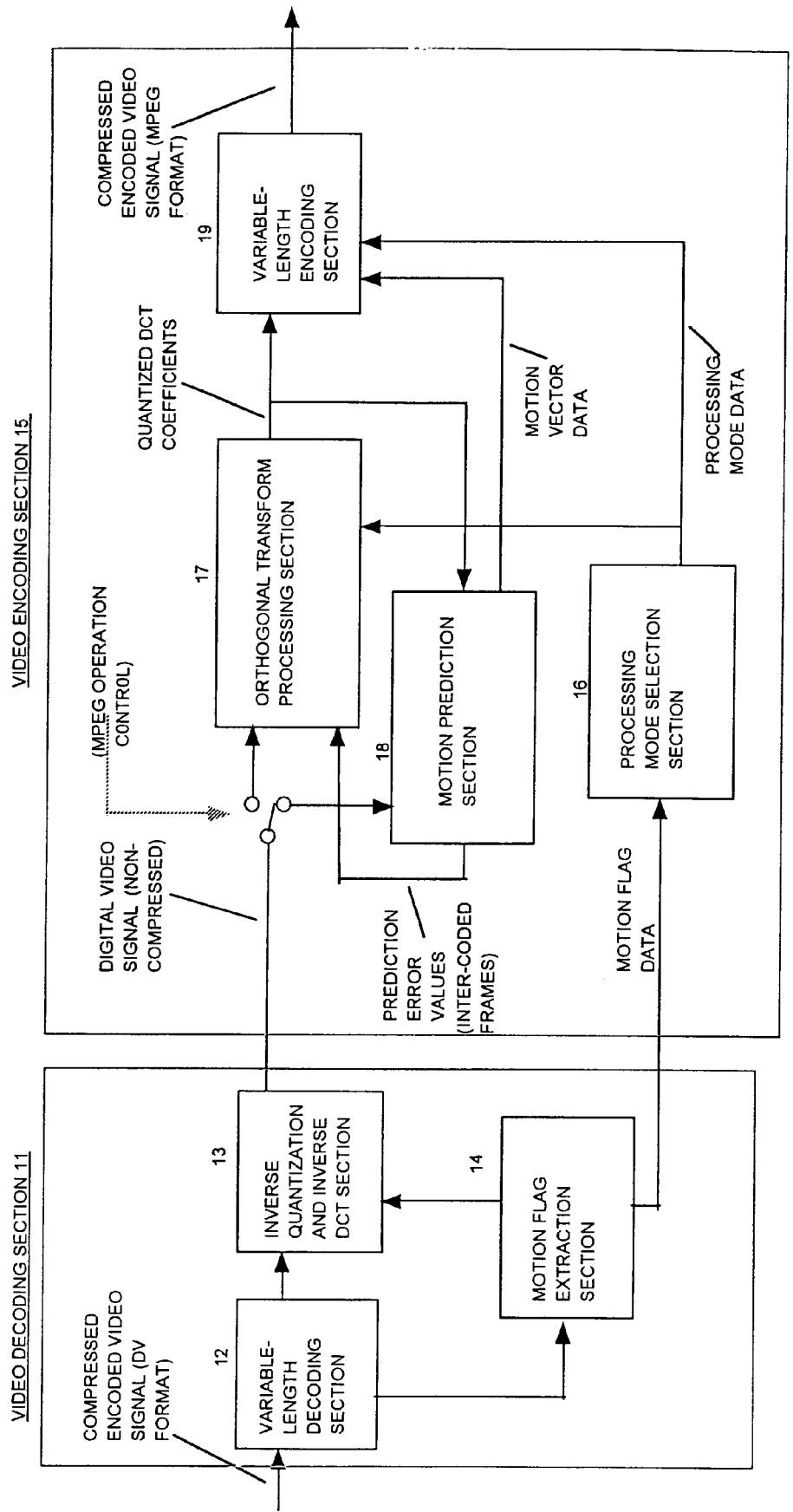
FIG. 1 is a general system block diagram of a first embodiment of a video signal conversion apparatus according to the present invention.

FIG. 1 is a general system block diagram showing a first embodiment of a video signal conversion apparatus according to the present invention. With this embodiment, the DCT processing which is executed as part of MPEG encoding is adaptively changed between interlaced-field mode processing and progressive-field mode processing, in accordance with the motion flag data obtained from the DV encoded data. With interlaced-field mode DCT processing, each 8×8 value DCT block is made up of values obtained from 8 successive lines of an interlaced-field frame, while with progressive-field mode DCT processing, each DCT block is obtained from only the odd-numbered or only the even-numbered lines of an interlaced-field frame, i.e. from the first field or from the second field of that frame. Adaptive selection of interlaced-field mode DCT processing or progressive-field mode DCT processing is executed in units of macroblocks.

In FIG. 1, a video decoding section 11 serves to convert an input compressed digital video signal which has been encoded in the DV format to a non-compressed digital video signal, and a video encoding section 15 converts that digital video signal to a compressed digital video signal that is encoded in the MPEG format. It will be assumed that this embodiment performs conversion to the MPEG-2 format.

The video decoding section 11 basically consists of a variable-length decoding section 12, an inverse quantization and inverse DCT section 13 and a motion flag extraction section 14. After being subjected to variable-length decoding by the variable-length decoding section 12, motion flags of respective macroblocks of the DV data are extracted by the motion flag extraction section 14. In addition, the output data from the variable-length decoding section 12 are subjected to inverse quantization and the inverse DCT processing by the inverse quantization and inverse DCT section 13, to obtain the non-compressed digital video signal. The motion flag data extracted by the motion flag extraction section 14 indicates for each of the six blocks constituting each DV macroblock whether that block is to subjected to DCT and inverse DCT processing as an interlaced-field mode block or as a progressive-field mode block. This information conveyed by the motion flag data for each DV is supplied by the motion flag extraction section 14 to the inverse quantization and inverse DCT section 13, for use in the inverse DCT processing. The motion flag data extracted by the motion flag extraction section 14 are also supplied to the video encoding section 15.

It can thus be understood that the output digital video signal from the inverse quantization and inverse DCT section 13 consists of successive interlaced-field frames, however for each frame, part or all of the frame may have been processed as two separate successively occurring fields, in the DCT processing and inverse DCT processing operations.

From another aspect, each of the respective motion flags specified for respective blocks indicates whether or not a relatively large amount of motion has been detected for that block. It will be apparent that motion flag which has been specified for a luminance signal block of a DV macroblock can be directly used as a motion flag for the correspondingly positioned luminance signal blocks of an MPEG macroblock (since in each case, the luminance signal blocks are respective 8×8 arrays of pixel values). However in the case of the color difference signal blocks, such a direct correspondence does not exist, as can be understood from diagram (e) of FIG. 13. Here, a set of four luminance signal blocks 600a of an MPEG macroblock are shown, i.e. with that set corresponding to 16 successive scan line portions of a displayed image. One of the two color difference signal blocks of that MPEG macroblock is designated as 600b, and is assumed to be the CB color difference signal block. It is further assumed that this MPEG macroblock corresponds in position to the two leftmost halves 603 of a pair of vertically adjacent macroblocks of the DV data, with the two CB color difference signal blocks of these DV macroblocks being designated as 601 and 602. It can thus be understood that to obtain a motion flag value for the MPEG color difference signal block 600b, it is necessary to use a combination of the two motion flags of the pair of DV color difference signal blocks 601, 602. To do this, the following convention is followed with the embodiments of the present invention described herein. A MPEG color difference signal block such as color difference signal block 600b which corresponds to the left-side pair of halves 603 of two vertically adjacent DV color difference signal blocks will be referred to as Cleft, while the MPEG color difference signal block which corresponds to the right-side pair of halves 604 of these DV color difference signal blocks will be referred to as Cright. The uppermost one of the two DV color difference signal blocks, i.e. 601, will be referred to as Chigh, while the lower one of these two DV color difference signal blocks, i.e., 602, will be referred to as Clow. The convention is as follows:

(a) If both the respective motion flags for Chigh and Clow are in the "1" state, indicating the "substantial motion" condition for each of these color difference signal blocks, then this represents a "substantial motion" condition for each of Cleft and Cright, i.e. "1" state motion flag values are assigned to each of these.

(b) If both the respective motion flags for Chigh and Clow are in the "0" state, indicating the "no motion" condition for each of these color difference signal blocks, then this represents a "no motion" condition for each of Cleft and Cright, i.e. "0" state motion flag values are assigned to each of these.

(c) If only one of the respective motion flags for Chigh and Clow is in the "1" state and the other is in the "0" state, then this represents a "substantial motion" condition for each of Cleft and Cright, i.e. "1" state motion flag values are assigned to each of these.

The use of condition (c) above provides optimum quality of a finally reproduced image, since the danger of incorrect judgement of motion for a MPEG color difference signal block is minimized. However if it is required to minimize the amount of processing involved in MPEG encoding as far as possible, then it would be possible to change the above condition (c) to become:

(c') If only one of the respective motion flags for Chigh and Clow is in the "1" state and the other is in the "0"

state, then this represents a "no substantial motion" condition for each of Cleft and Cright, i.e. "0" state motion flag values are assigned to each of these.

Thus, condition (c) can be determined in accordance with particular requirements of a specific system, in accordance with whether picture quality is to be optimized as far as possible or the amount of encoding processing is to be minimized.

It can hence be understood that the motion information which is expressed by the respective motion flags assigned to each of respective blocks of a DV format macroblock by the DV encoding processing can be utilized also in the MPEG encoding process, as described in the following.

The video encoding section 15 is basically made up of an orthogonal transform processing section 17, a variable-length encoding section 19, a motion prediction section 18 and a processing mode selection section 16. In the following description of embodiments, MPEG-2 encoding will be assumed, unless stated otherwise. Since the operating principles of MPEG encoding are now well known, only the points of difference between this embodiment and a conventional type of MPEG encoder will be described in detail in the following. It will be assumed for simplicity that intra-frame encoding (abbreviated to intra-coding) or inter-frame encoding (abbreviated to inter-coding) of the input digital video signal is selected in units of frames, and only encoding of I-frames (independently intra-coded frames) and P-frames (inter-coded by forward-directed motion prediction using a preceding reference frame) will be considered. The non-compressed video signal that is output from the inverse quantization and inverse DCT section 13 of the video decoding section 11 is supplied to the video encoding section 15, to be input to either the orthogonal transform processing section 17 (in the case of a macroblock for which intra-coding is to be executed) or to the motion prediction section 18 (in the case of a macroblock for which inter-coding is to be executed).

The orthogonal transform processing section 17 converts each luminance signal block and color difference signal block of a macroblock supplied thereto, i.e., which is to be intra-coded, into a corresponding array of DCT coefficients, which are then quantized, and supplied to the variable-length encoding section 19. In addition, the quantized DCT coefficients are supplied to the motion prediction section 18, for use in reconstructing those frames which are to be utilized as reference frames in motion prediction processing.

The motion prediction section 18 derives, for each luminance signal block and color difference signal block of a frame supplied thereto, i.e., which is to be inter-coded, a corresponding set of prediction error values and a motion vector, with the prediction error values being supplied to the orthogonal transform processing section 17 and the motion vectors supplied to the variable-length encoding section 19. The sets of prediction error values are converted to corresponding sets of quantized DCT coefficients by the orthogonal transform processing section 17, and these are input to the variable-length encoding section 19. The variable-length encoding section 19 performs variable-length encoding of the quantized DCT coefficients supplied thereto, and combines the motion vectors and processing mode data (described in the following) into the resultant code which is generated and output as the MPEG format compressed data.

For each MPEG macroblock (described hereinabove referring to FIG. 13) the processing mode selection section 16 judges, based upon the set of respective values of the motion flags of the six blocks constituting that macroblock, whether that macroblock is to be DCT-processed in interlaced-field mode or in progressive-field mode. For example, the processing mode selection section 16 can be configured to operate such that if at least one of the four luminance signal blocks of a MPEG macroblock has the corresponding motion flag indicating the "large amount of motion" condition, i.e. is in the logic "1" state, then the processing mode selection section 16 specifies that DCT processing of that macroblock is to be executed in progressive-field mode, and that otherwise, DCT processing of that macroblock is to be executed in interlaced-field mode. Since a substantially greater amount of processing time is required to apply progressive-field mode DCT processing to a macroblock than is necessary for interlaced-field mode DCT processing, it is desirable to minimize the amount of progressive-field mode processing that must be executed. It can be understood that by using the motion flag information in this way, minimization can be very easily accomplished, without the danger of a deterioration of image quality in a finally reproduced image, since interlaced-field mode DCT processing will only be applied to each macroblock for which little or no motion occurs in the $1/60$ second period between the two successive fields constituting the frame containing the macroblock.

The concept of interlaced-field mode and progressive-field mode DCT processing in units of MPEG macroblocks can be understood from the diagrams of FIG. 3. Here, diagram (a) illustrates interlaced-field mode processing. Here, the four luminance signal blocks of an MPEG macroblock (numbered from 1 to 4), each consisting of a set of 8×8 pixel values within an interlaced-field frame, are successively extracted in interlaced-line form, to be sequentially subjected to DCT processing.

Diagram (b) of FIG. 3 illustrates how the four luminance signal blocks of such a macroblock are subjected to progressive-field mode DCT processing. In this case, the odd-numbered line portions of the left-side half of the set of four luminance signal blocks of the macroblock are first extracted and processed, as an 8×8 value DCT block, then the odd-numbered line portions of the right-side half of the array of four luminance signal blocks of the macroblock are extracted and processed, then the even-numbered line portions of the left-side half are similarly operated on, followed by the even-numbered line portions of the right-side half.

Figure 2:
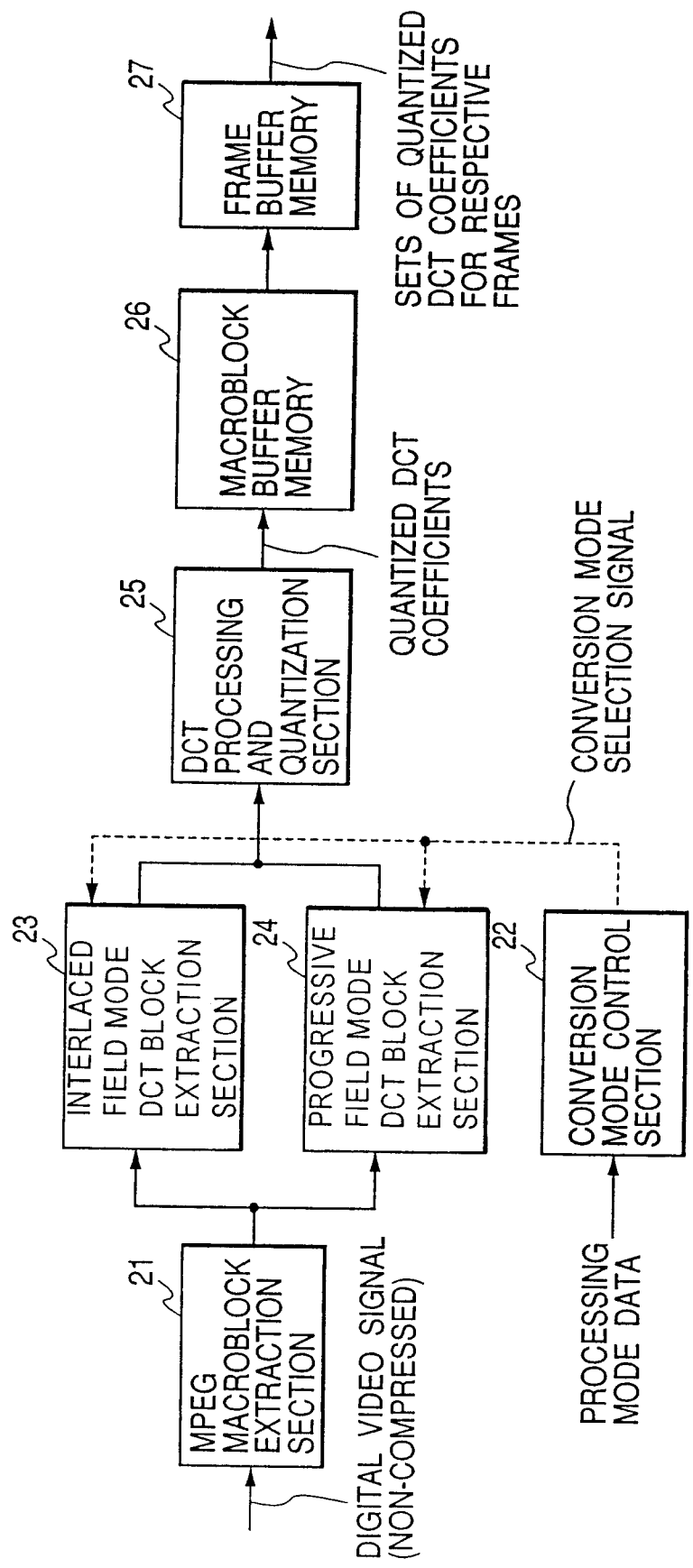
FIG. 2 is a system block diagram of an orthogonal transform section of a video encoding section in the embodiment of FIG. 1.

FIG. 2 is a system block diagram showing the general configuration of the orthogonal transform processing section 17 of this embodiment. This is formed of a MPEG macroblock extraction section 21, an interlaced-field mode DCT block extraction section 23 and a progressive-field mode DCT block extraction section 24, a DCT processing and quantization section 25, a macroblock buffer memory 26 and a frame buffer memory 27. The input digital video signal (e.g., consisting of successive pixel values of a frame which is to be intra-coded) is supplied to the MPEG macroblock extraction section 21, which extracts successively positioned MPEG macroblocks, and supplies each of these to the interlaced-field mode DCT block extraction section 23 and the progressive-field mode DCT block extraction section 24. The interlaced-field mode DCT block extraction section 23 successively extracts the four interlaced-field mode DCT blocks, described above referring to diagram (a) of FIG. 3, from each macroblock supplied thereto. The progressive-field mode DCT block extraction section 24 successively extracts the four progressive-field mode DCT blocks, described above referring to diagram (b) of FIG. 3, from each macroblock supplied thereto. The conversion mode control section 22 receives the processing mode data from the processing mode selection section 16, determined by the motion flag flags which correspond to respective blocks of the frame, as described above. If the processing mode data designates that each of the blocks of the macroblock which is currently being processed is to be subjected to interlaced-field mode DCT processing, then the conversion mode control section 22 activates the interlaced-field mode DCT block extraction section 23, so that interlaced-field mode DCT blocks are produced, while if the processing mode data designates that each of the blocks of that macroblock is to be subjected to progressive-field mode DCT processing then the conversion mode control section 22 activates the progressive-field mode DCT block extraction section 24, so that the progressive-field mode DCT blocks are produced.

Each block thus produced is supplied to the DCT processing and quantization section 25, to be converted to a corresponding set of DCT coefficients, which are then quantized, and the quantized DCT coefficients supplied to a macroblock buffer memory 26. When all of the quantized DCT coefficients for a macroblock have been set into the macroblock buffer memory 26, these are transferred to the frame buffer memory 27, and when the respective sets of quantized DCT coefficients for the macroblocks of an entire frame have been set into the frame buffer memory 27, these are read out and supplied to the variable-length encoding section 19. Similar operations can be applied to the prediction error values which are derived by the motion prediction section 18 for an inter-coded frame and input to the MPEG macroblock extraction section 21. In that way, successive sets of quantized DCT coefficients for respective frames of the video signal are produced from the frame buffer memory 27, to be supplied to the variable-length encoding section 19.

The motion prediction section 18 executes the usual type of motion prediction processing, applying dequantization and inverse DCT processing to respective sets of DCT coefficients supplied from the orthogonal transform processing section 17, to reconstruct and store successive blocks of frames for use as reference frames for the motion prediction processing. Although not shown in the drawing, for maximum accuracy of reconstructing the reference frames, it is preferable to utilize the processing mode data of the macroblock corresponding to a set of DCT coefficients, when executing such inverse DCT processing of the coefficients, so that the appropriate type of inverse DCT processing (interlaced-field mode or progressive-field mode) is applied.

For each macroblock which is encoded as described above, the corresponding processing mode data and (in the case of an inter-coded macroblock) the motion vector derived for that macroblock by motion prediction, are combined with the set of quantized DCT coefficients obtained for that macroblock, by the variable-length encoding section 19, with a resultant stream of MPEG-2 encoded compressed video data being output from the variable-length encoding section 19.

It can thus be understood that with this embodiment, the form of DCT processing which is applied to respective macroblocks of the non-compressed digital video signal is adaptively selected, based on the motion flag data that is derived from the DV encoded compressed digital video signal, such as to minimize the amount of DCT processing while at the same time ensuring that this minimization will not adversely affect the finally obtained reproduced image quality.

Although it has been assumed in the above that the processing mode selection section 16 selects that progressive-field mode processing is to be applied to a macroblock if at least one of the luminance signal block motion flags of that macroblock is in the condition indicating "large amount of motion", it would be possible to use other standards for making that judgement. The essential point is that the processing mode selection section 16 judges whether progressive-field mode DCT processing or interlaced-field mode DCT processing is to be applied to all of the six blocks of a MPEG macroblock, based upon the states of one or more of the six motion flags respectively corresponding to these blocks, i.e., the determination of either progressive-field mode or interlaced-field mode DCT processing is executed in units of macroblocks.

However since each luminance signal block of a macroblock covers an area which is ¼ of that covered by each of the color difference signal blocks of that macroblock, it is found that the states of the motion flags of the luminance signal blocks will in general provide more precise motion information than those of the color difference signal blocks. For that reason, it is preferable to base the judgement performed by the processing mode selection section 16 on the state of one or more of the motion flags corresponding to the luminance signal blocks of each macroblock, rather than on the states of the motion flags which correspond to the color difference signal blocks.

In order to maximize encoding efficiency, it is desirable to minimize the number of macroblocks that are subjected to progressive-field mode DCT processing, as far as possible. However an excessive reduction will result in deterioration of the reproduced image quality. As an alternative to the judgement standard described above (i.e., progressive-field mode DCT processing is applied to a macroblock if at least one motion flag for a luminance signal block is in the "1" state, indicating "large amount of motion"), it would be possible to use a standard whereby if at least two or more of the motion flags corresponding to luminance signal blocks of a macroblock are in the "1" state, then progressive-field mode DCT processing will be applied to that macroblock, while otherwise, interlaced-field mode DCT processing will be applied.

Alternatively, if the amount of DCT processing must be further reduced, a standard could be used whereby if all of the four motion flags corresponding to the luminance signal blocks of a macroblock are in the "1" state, then progressive-field mode DCT processing will be applied to that macroblock, while otherwise, interlaced-field mode DCT processing will be applied. That is to say, interlaced-field mode DCT processing will be specified for the macroblock only if at least one of the motion flags of the luminance signal blocks is in the "0" state.

In the case of a frame in which the image has been momentarily illuminated by a photographic flash, there will be a large variation in the levels of the luminance signal block values of that frame, without a corresponding change in the levels of the color difference signal block values. For that reason, it may be preferable to establish, together with a standard based on the motion flags corresponding to the luminance signal blocks as described above, a standard whereby if both of the motion flags corresponding to the color difference signal blocks of a macroblock is in the "0" state, i.e., each indicating the condition "no image motion", then this is judged as indicating "no motion" for the macroblock, so that prgressive-field mode DCT processing will not be selected for the macroblock. Such a standard could prevent the occurrence of errors which may result if image motion is judged only on the basis of changes in luminance values.

If the number of macroblocks which will be subjected to progressive-field mode DCT processing is to be minimized, and processing efficiency accordingly enhanced as far as possible, then it would be possible to use a combination of such standards. For example, a standard could be established whereby progressive-field mode DCT processing will be designated by the processing mode selection section 16 for a macroblock only under the condition that all of the respective motion flags of the four luminance signal blocks of a MPEG macroblock are in the "1" state, while at least one of the motion flags corresponding to the color difference signal blocks of that macroblocks is in the "1", while otherwise, interlaced-field mode DCT processing will be designated.

Second Embodiment

A second embodiment of a video signal conversion apparatus according to the present invention will be described, whereby motion flags contained in the DV encoded video data are utilized to adaptively control changeover between two types of motion prediction processing that can be applied to a frame or macroblock that is to be inter-coded. Specifically, changeover between interlaced-field mode motion prediction and progressive-field mode motion prediction is controlled, in units of macroblocks.

Figure 4:
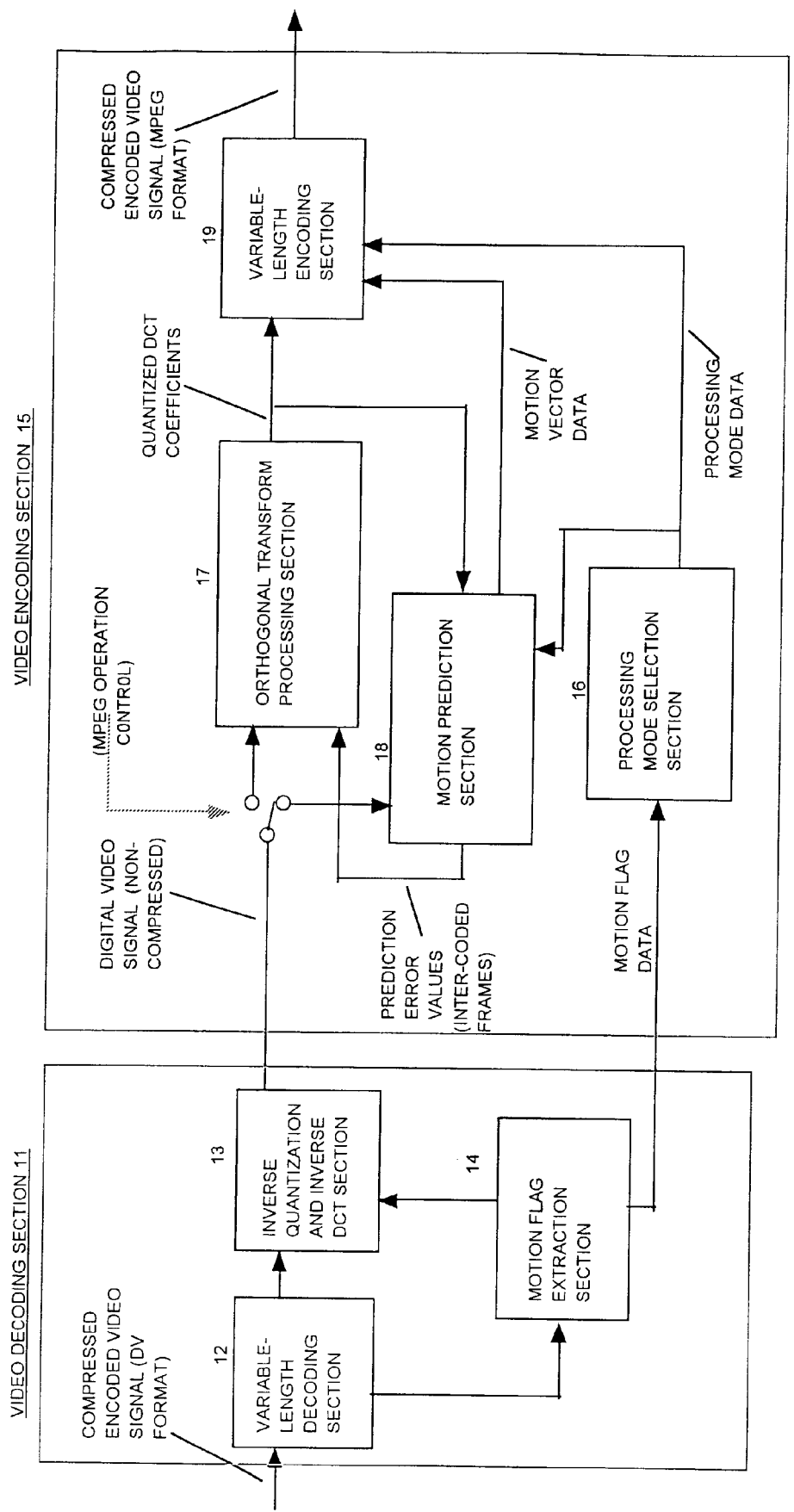
FIG. 4 is a general system block diagram of a second embodiment of a video signal conversion apparatus according to the present invention.

FIG. 4 is a general system block diagram of this embodiment, in which system blocks corresponding to those of the first embodiment of FIG. 1 are indicated by identical reference numerals to those of FIG. 1. This embodiment differs from the first embodiment in that the processing mode data which are produced by the processing mode selection section 16 of a video encoding section 15 for each of respective macroblocks of a frame of the non-compressed video signal, based on the states of the set of motion flags corresponding to the macroblock in accordance with some predetermined standard as described for the first embodiment, are applied to control the form of motion prediction processing that is executed by a motion prediction section 18.

Figure 5:
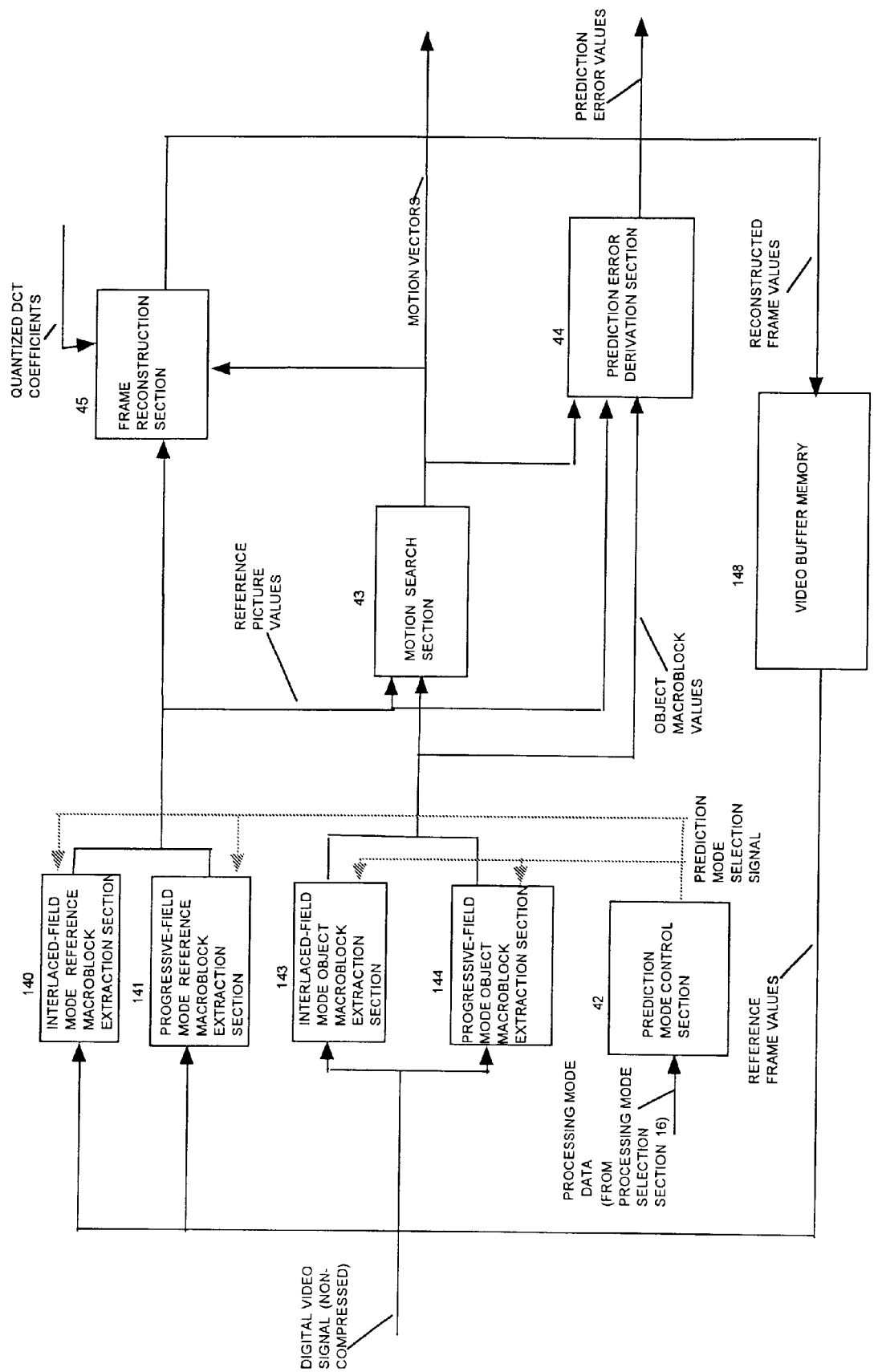
FIG. 5 is a system block diagram of a motion prediction section of a video encoding section in the embodiment of FIG. 4.

FIG. 5 is a system block diagram showing the internal configuration of the motion prediction section 18 of this embodiment. This consists of an interlaced-field mode reference macroblock extraction section 140, a progressive-field mode reference macroblock extraction section 141, an interlaced-field mode object macroblock extraction section 143, a progressive-field mode object macroblock extraction section 144, a motion search section 43, a prediction error derivation section 44, a frame reconstruction section 45 and changeover switches 145, 146, together with a frame reconstruction section 45 for storing reconstructed reference frames. In the following a macroblock, extracted from a frame of the input non-compressed digital video signal, which is currently being inter-coded by motion prediction processing will be referred to as the object macroblock. An interlaced-field frame or a single field of a frame, which is used as a reference image for motion prediction, will be referred to as a reference picture. In FIG. 5, the interlaced-field mode object macroblock extraction section 143 can be activated to extract successive interlaced-field mode object macroblocks from a frame of the input digital video signal, while the progressive-field mode object macroblock extraction section 144 can be activated to extract successive progressive-field mode object macroblocks (each consisting of two half-macroblocks as described in the following) from the input digital video signal. Selection of activation of the interlaced-field mode object macroblock extraction section 143 or progressive-field mode object macroblock extraction section 144 is performed by a prediction mode selection signal, produced from the prediction mode control section 42 based upon the processing mode data which are generated by the processing mode selection section 16 as described for the first embodiment hereinabove. The successive interlaced-field mode object macroblocks or successive progressive-field mode object macroblocks which are thereby produced are supplied to the motion search section 43.

The interlaced-field mode reference macroblock extraction section 140 reads out from the video buffer memory 148 an interlaced-field frame for use as an interlaced-field reference picture and extracts successively positioned macroblocks from within that frame, to be supplied to the motion search section 43 as reference macroblocks. The progressive-field mode reference macroblock extraction section 141 successively reads out from the video buffer memory 148 a sequential pair of fields of a frame, for use as progressive-field mode reference pictures, and for each of these fields, the progressive-field mode reference macroblock extraction section 141 extracts successively positioned macroblocks from within the field, to be supplied to the motion search section 43 as reference macroblocks. The prediction mode selection signal produced from the prediction mode control section 42 activates either the interlaced-field mode reference macroblock extraction section 140 or the progressive-field mode reference macroblock extraction section 141 to supply reference macroblocks to the motion search section 43 for use in motion search processing.

Figure 6:
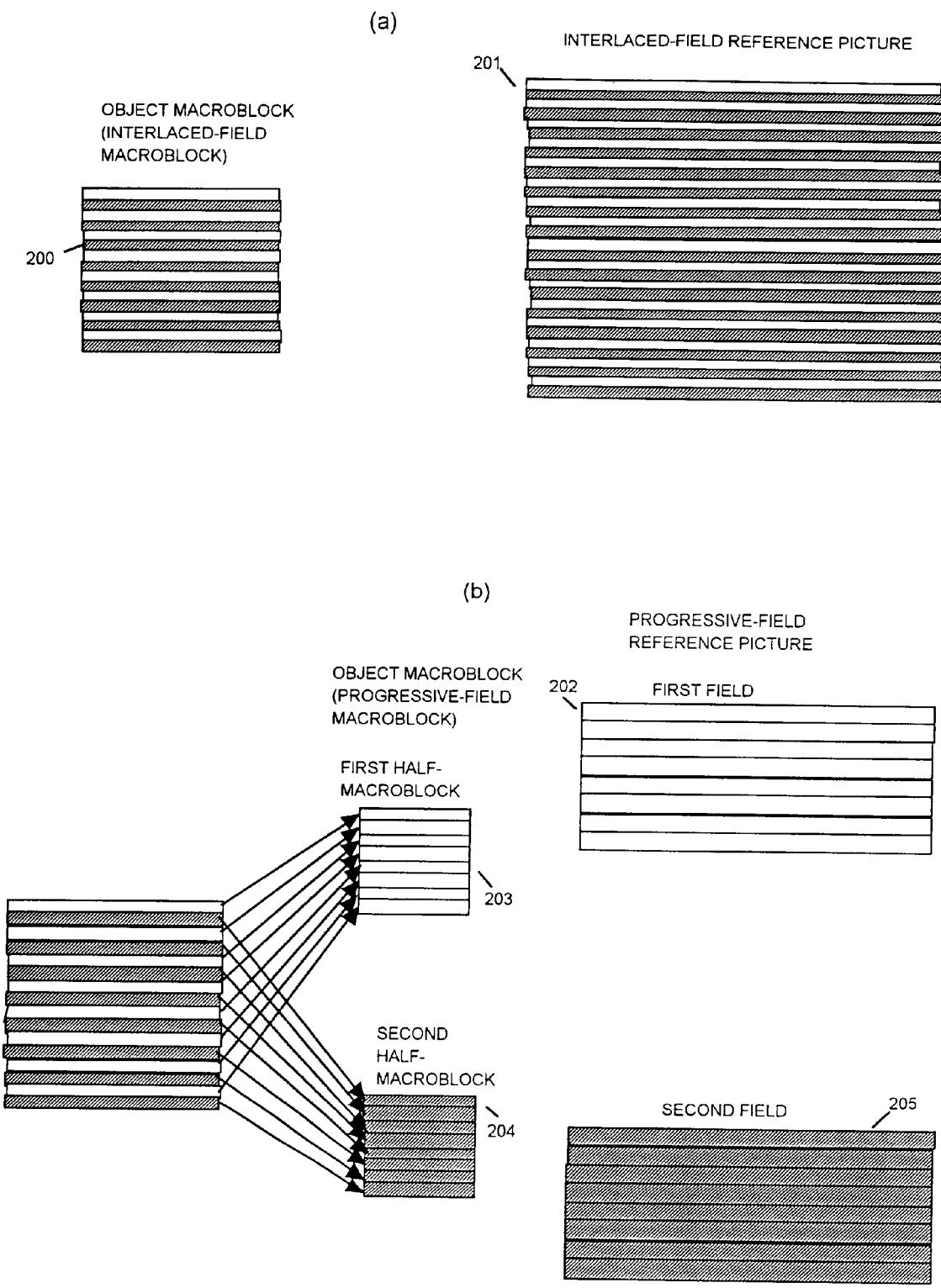
FIG. 6 conceptually illustrates the principles of a an interlaced-field mode motion search operation applied for a macroblock, using an interlaced-field frame as a reference picture, and a progressive-field mode motion search operation, using respective fields of a frame as separate reference pictures in conjunction with respective halves of the macroblock.

The respective configurations of the interlaced-field mode object macroblocks, progressive-field mode object macroblocks, and two types of reference pictures can be understood by referring to FIG. 6. Here, in diagram (a), numeral 200 illustrates an interlaced-field mode object macroblock. This has been directly extracted from an interlaced-field frame of the input digital video signal, and contains successively alternating line portions from the first field and second field of that frame. Motion search is executed by the motion search section 43, for such an object macroblock, by successively moving the object macroblock with respect to the corresponding interlaced-field mode reference picture, indicated by numeral 201 in FIG. 6, through comparison with successive reference macroblocks, within a predetermined search range in the reference picture, until a position is reached at which the degree of difference between the object macroblock and the reference macroblock is a minimum. When such a condition of block matching is reached, i.e. an interlaced-field mode reference macroblock within the reference picture, having sufficient correlation with the object macroblock is found, the corresponding motion vector (expressing the displacement of the object macroblock with respect to the reference macroblock) is thereby obtained. The correlated reference macroblock is then supplied to the prediction error derivation section 44, which then successively derives the respective amounts of difference between the pixel values of the object macroblock and those of the reference macroblock, i.e., derives a set of prediction error values for that interlaced-field mode object macroblock.

That set of prediction error values is then supplied to the orthogonal transform processing section 17 of the video encoding section 15, to be converted to a set of quantized DCT coefficients. That set of quantized DCT coefficients is then supplied to the variable-length encoding section 19 to be subjected to variable-length encoding, then combined with the motion vector and the processing mode data for the object macroblock.

The set of quantized DCT coefficients thus derived for the object macroblock is supplied from the orthogonal transform processing section 17 to the frame reconstruction section 45, together with the correlated interlaced-field reference macroblock corresponding to that object macroblock. Dequantization and inverse DCT processing are applied to the quantized DCT coefficients, to recover the set of prediction error values obtained for that macroblock, and these are used in conjunction with the correlated reference macroblock to reconstruct the object macroblock, with the resultant data being stored in the video buffer memory 148, as part of a reconstructed frame for use in subsequent motion prediction processing.

In FIG. 6, diagram (b) illustrates a progressive-field mode object macroblock. As shown, this consists of a first half 203 of an interlaced-field macroblock that is extracted from an input video signal frame, and consists of only line portions of a first field of that frame (i.e., the odd-numbered line portions), and a second half-macroblock 204, which consists of only line portions of the second field of that frame. The motion search section 43 first uses the reference macroblocks that are produced from the progressive-field mode reference macroblock extraction section 141 to perform a motion search for the half-macroblock 203 (i.e. using the set of odd-numbered lines of the reference frame) within a predetermined search range, to thereby obtain a first motion vector indicating a first correlated reference macroblock within that reference picture. The prediction error values for that first half-macroblock 203, with respect to that reference macroblock of the first reference picture, are then derived by the prediction error derivation section 44 and supplied to the orthogonal transform processing section 17 for conversion to a set of quantized DCT coefficients. That set of DCT coefficients is then supplied from the orthogonal transform processing section 17 to the frame reconstruction section 45, together with the first correlated reference macroblock, supplied from the progressive-field mode reference macroblock extraction section 141. A reconstructed first half-macroblock is thereby derived by the frame reconstruction section 45.

The second half-macroblock 204 is then output from the progressive-field mode object macroblock extraction section 144, together with the second reference picture supplied from the progressive-field mode reference macroblock extraction section 141, and the above process is repeated to derive a second motion vector, a second set of prediction error values which are converted to quantized DCT coefficients, and a reconstructed second half-macroblock which is derived by the frame reconstruction section 45 and stored in the video buffer memory 148. That is to say, the the motion search section 43 now executes a motion search operation with respect to a reference picture consisting of the second field 205 of the reference frame, supplied from the progressive-field mode reference macroblock extraction section 141.

The reconstructed first and second half-macroblocks constitute a reconstructed macroblock, which is stored in the video buffer memory 148. The respective sets of quantized DCT coefficients derived for the first and second half-macroblocks are subjected to variable-length encoding by the variable-length encoding section 19, and the resultant set of code data are combined with the first and second motion vectors and with the processing mode data that were derived for the object macroblock by the processing mode selection section 16, and the resultant set of MPEG encoded data is output from the variable-length encoding section 19 as the compressed data for one macroblock.

It will be apparent that when such a set of compressed data is subsequently decoded, the corresponding processing mode data can readily be used to execute the appropriate decoding processing for the respective sets of data of the first and second half-macroblocks, so that detailed description will be omitted.

It can thus be understood that with this embodiment:

(a) for each inter-coded macroblock that has interlaced-field mode motion prediction processing specified by the corresponding processing mode data, a set of MPEG compressed data consisting of a single set of variable-length encoded quantized DCT coefficients together with the corresponding motion vector and the corresponding processing mode data is generated, whereas, (b) for each inter-coded macroblock that has progressive-field mode motion prediction processing specified by the corresponding processing mode data, a set of MPEG compressed data consisting of the corresponding processing mode data together with a first set of variable-length encoded quantized DCT coefficients and a first motion vector (for the first half-macroblock), and a second set of variable-length encoded quantized DCT coefficients together with a second motion vector (for the second half-macroblock) is generated.

The orthogonal transform processing section 17 of this embodiment is a usual type of MPEG DCT processing and quantization section, and can for example be of similar configuration to the orthogonal transform processing section 17 of the first embodiment, but with the conversion mode control section and field mode DCT block extraction section omitted.

Third Embodiment

Figure 7:
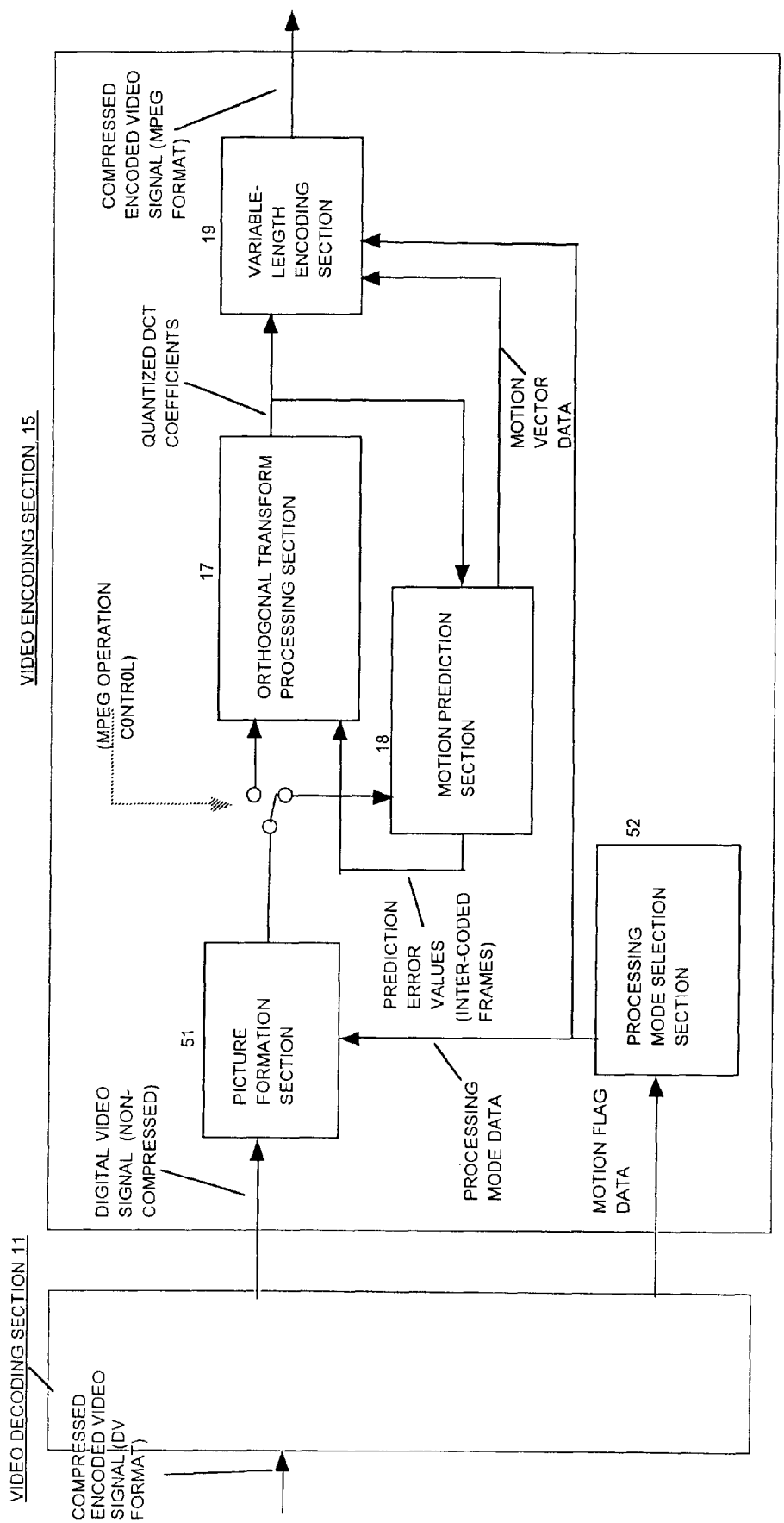
FIG. 7 is a general system block diagram of a third embodiment of a video signal conversion apparatus according to the present invention.

A third embodiment of a video signal conversion apparatus according to the present invention will be described in the following. With this embodiment, selection of either interlaced-field mode or progressive-field mode MPEG compression encoding can be executed in units of pictures (i.e. entire interlaced-field frames or entire fields), based on the states of the motion flags contained in the DV data. As shown in FIG. 7, the video encoding section 15 of this embodiment consists of a picture formation section 51 and a processing mode selection section 16, together with an orthogonal transform processing section 17, a motion prediction section 18 and a variable-length encoding section 19. The orthogonal transform processing section 17 and motion prediction section 18 perform the usual MPEG encoding processing functions i.e., functioning, for each picture of the input signal that is to be intra-coded, to convert the respective macroblocks of that picture into corresponding sets of quantized DCT coefficients, and for each picture which is to be inter-coded, to convert the respective macroblocks of that picture into corresponding motion vectors and sets of quantized DCT coefficients expressing prediction error values Hence, detailed description of these will be omitted. The non-compressed video signal that is supplied from the video decoding section 11 is supplied to a picture formation section 51, which is controlled in accordance with the processing mode data to selectively transfer video data in picture units to be subjected to interlaced-field or progressive-field mode MPEG encoding processing.

As an interlaced-field frame of the non-compressed video signal is supplied to the picture formation section 51, and the corresponding set of motion flags of respective blocks of that frame are supplied to the processing mode selection section 52 from the video decoding section 11, the processing mode selection section 52 executes counting to obtain the total number of these flags which each indicate the "large amount of motion" state, i.e. are in the "1" state. The finally obtained number is then compared with a predetermined value, and if that value is not exceeded, the processing mode selection section 52 designates that interlaced-field mode encoding is to be used as the MPEG encoding mode for that frame. Specifically, the processing mode selection section 52 supplies processing mode data to the picture formation section 51 which cause the picture formation section 51 to directly transfer the corresponding interlaced-field frame to be subjected to MPEGencoding by the orthogonal transform processing section 17 and motion prediction section 18, as illustrated in diagram (a) of FIG. 8. The resultant quantized DCT coefficients thereby obtained for that frame are subjected to variable-length encoding in the variable-length encoding section 19, and the resultant compressed data are then combined with any motion vectors which may have been derived for inter-coded macroblocks, and with the processing mode data that were determined for that frame, and output from the variable-length encoding section 19 as the compressed MPEG video data for the frame.

However if the count of the number of "1" state motion flags that is obtained by the processing mode selection section 52 for that frame is found to exceed the predetermined value, then the processing mode selection section 52 designates that progressive-field mode encoding is to be used as the MPEG encoding mode. In that case, the processing mode selection section 52 supplies processing mode data to the picture formation section 51 which specifies that the picture formation section 51 is to perform interlaced-field mode selection, i.e. as shown in diagram (b) of FIG. 8, that frame is separated by the picture formation section 51 into into the first field (odd-numbered lines of the frame) and second field (even-numbered lines of the frame), and these fields are successively output from the picture formation section 51, to be sequentially subjected to MPEG encoding. The resultant pair of sets of quantized DCT coefficients thereby successively obtained by the orthogonal transform processing section 17 for the first and second fields of that frame are subjected to variable-length encoding in the variable-length encoding section 19, and the resultant first and second sets of compressed data for the two fields are combined with the motion vectors obtained by the motion prediction section 18 for respective inter-coded macroblocks and with the processing mode data that was determined for that frame, and output from the variable-length encoding section 19 as the compressed MPEG video data for the frame.

Thus with this embodiment of the invention, changeover is adaptively performed between MPEG processing of pictures consisting of entire interlaced-field frames and pictures consisting of respective fields extracted from frames. Control of this changeover can be readily performed in units of pictures, and since the motion flags which are available from the DV data are utilized as a basis for controlling this adaptive changeover operation, no significant amount of extra processing is required to execute this control.

Since executing DCT conversion and motion prediction operations in units of entire frames involves substantially less processing than is required for the case of operating in units of fields, this embodiment provides significant advantages. That is to say, interlaced-field mode processing is applied whenever that can be done without adversely affecting the finally obtained reproduced image quality, i.e. is applied whenever it is determined by the processing mode selection section 52 that the amount of image motion within a frame is lower than a predetermined level, as indicated by the total number of motion flags of that frame which each indicate the "large amount of motion" condition.

Fourth Embodiment

Figure 9:
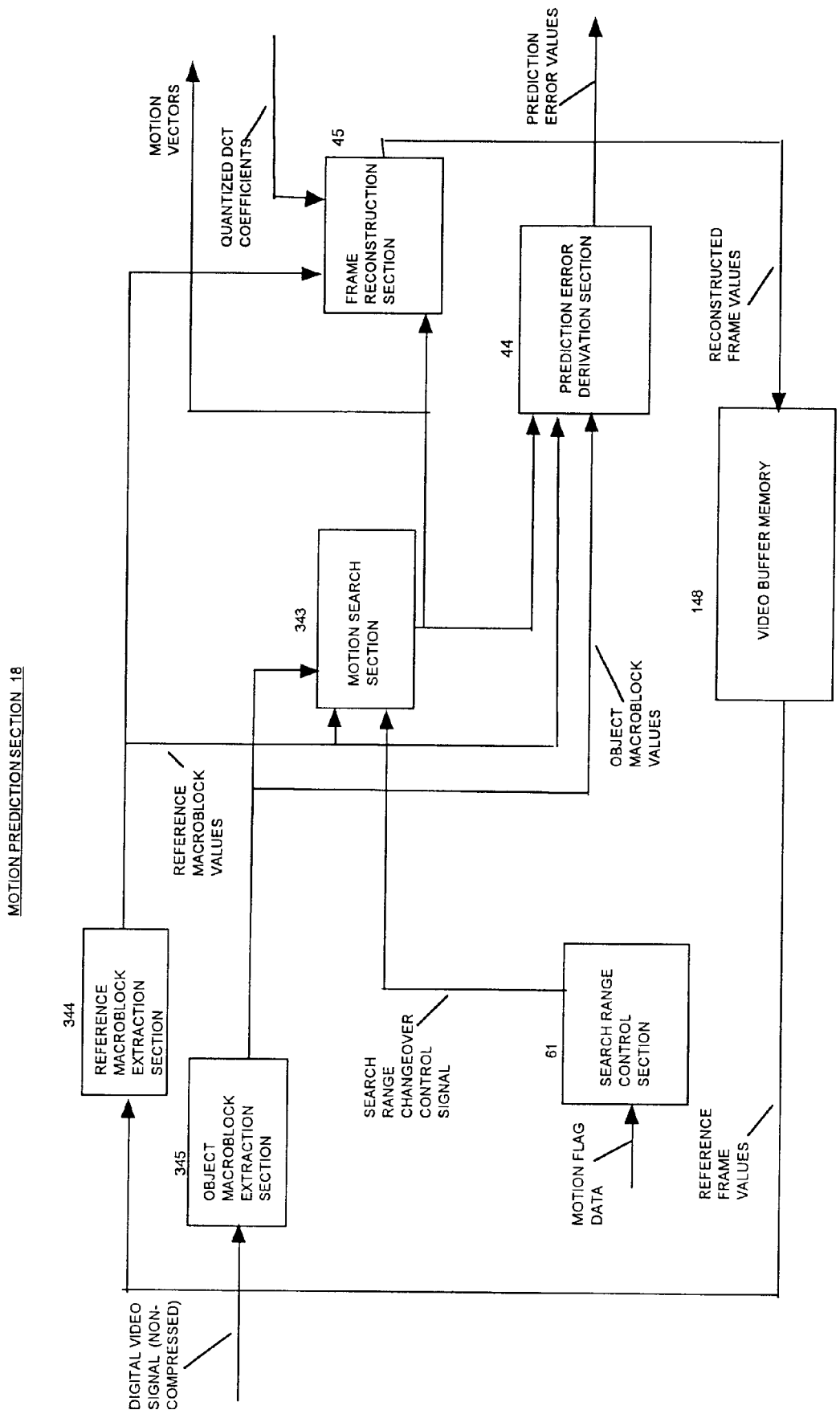
FIG. 9 is a general system block diagram of a fourth embodiment of a video signal conversion apparatus according to the present invention, whereby the search range which is applied for motion prediction processing of a macroblock is adaptively selected based on motion flag data for the macroblock.

A fourth embodiment of a video signal conversion apparatus according to the present invention will be described in the following, whereby the search range used for motion prediction is adaptively selected based on the motion flag data provided by the motion flags. The configuration and operation of this embodiment differs from a usual type of MPEG encoding apparatus only with respect to the motion prediction operation, so that only the motion prediction section of the embodiment will be described in detail. FIG. 9 shows the motion prediction section 18 of this embodiment. In addition to a prediction error derivation section 44, a frame reconstruction section 45, a prediction error derivation section 44, a frame reconstruction section 45 and a video buffer memory 148, this motion prediction section includes a search range control section 61 which performs the function of a processing mode selection section as described for the preceding embodiments, but with the processing mode mode data thereby derived being used as a search range control signal, as described in the following. The search range control section 61 receives the motion flag data that are supplied from a motion flag extraction section such as the section 14 of video decoding section 11 shown in FIG. 1 and described hereinabove, and a motion search section 43 executes motion search operations within a search range in a reference frame, with one of two possible search ranges being selected in accordance with the state of the search range changeover control signal that is produced by the search range control section 61.

It will be assumed that motion prediction is performed using complete interlaced-field frames as reference pictures, although the embodiment is equally applicable to the case of utilizing individual fields as reference pictures. To execute motion prediction processing of an object macroblock, the object macroblock extraction section 345 extracts that object macroblock from the input digital video signal (that has been derived by decoding a DV compressed encoded video signal as described hereinabove) and supplies the object macroblock to the motion search section 43 and prediction error derivation section 44. The search range control section 61 judges the states of the respective motion flags corresponding to the blocks of the object macroblock, and if at least one of these motion flags is in the "1" state, indicating the "large amount of motion" condition, then the search range control section 61 designates to the motion search section 43 that a wide search range is to be utilized in executing a motion search operation. If none of these motion flags is in the "1" state, indicating that there is substantially no motion of the object macroblock with respect to the reference frame, then the search range control section 61 designates to the motion search section 43 that a narrow search range is to be utilized.

Typically, the wide search range might be a region of 1024×1024 displacement units surrounding the position of the object macroblock, where the size of each displacement unit is ½ of the distance between two adacent pixels. This is achieved by executing interpolation between pixel values corresponding to adjacent pairs of pixels. Such a search range, designated by numeral 72, surrounding an object macroblock 71, is illustrated in diagram (a) of FIG. 10. The narrow search range can for example be a region of size 1024×256 displacement units, surrounding the object macroblock position, as illustrated by region 73 in diagram (b) of FIG. 10. Alternatively, the "narrow" search range can be made even smaller, e.g., 256×256 displacement units, as illustrated in diagram (c) of FIG. 10.

The features of this embodiment can readily be combined with those of other embodiments. In particular, such a search range control capability could be applied to the motion prediction section of the second embodiment of the invention, shown in FIG. 5.

Furthermore, this embodiment is applicable to MPEG-1 processing as well as to MPEG-2 processing.

This embodiment provides significant advantages, since an extremely large amount of processing is involved in a motion search operation within a reference frame, i.e., an operation whereby each of the pixel values of the object macroblock must be compared with respective pixel values of a corresponding macroblock within the reference frame, at each of successively different positions within the search range of the reference frame. With this embodiment, the size of the search range can be minimized if it is found from the motion flags of the object macroblock that the amount of motion of the object macroblock in relation to the reference frame is sufficently small. It can thus be appreciated that this embodiment can provide a substantial increase in the speed of the motion prediction processing that must be executed by an MPEG encoding apparatus, simply by using the information that is contained in the motion flags which are extracted from the DV encoded video data.

Fifth Embodiment

Figure 11:
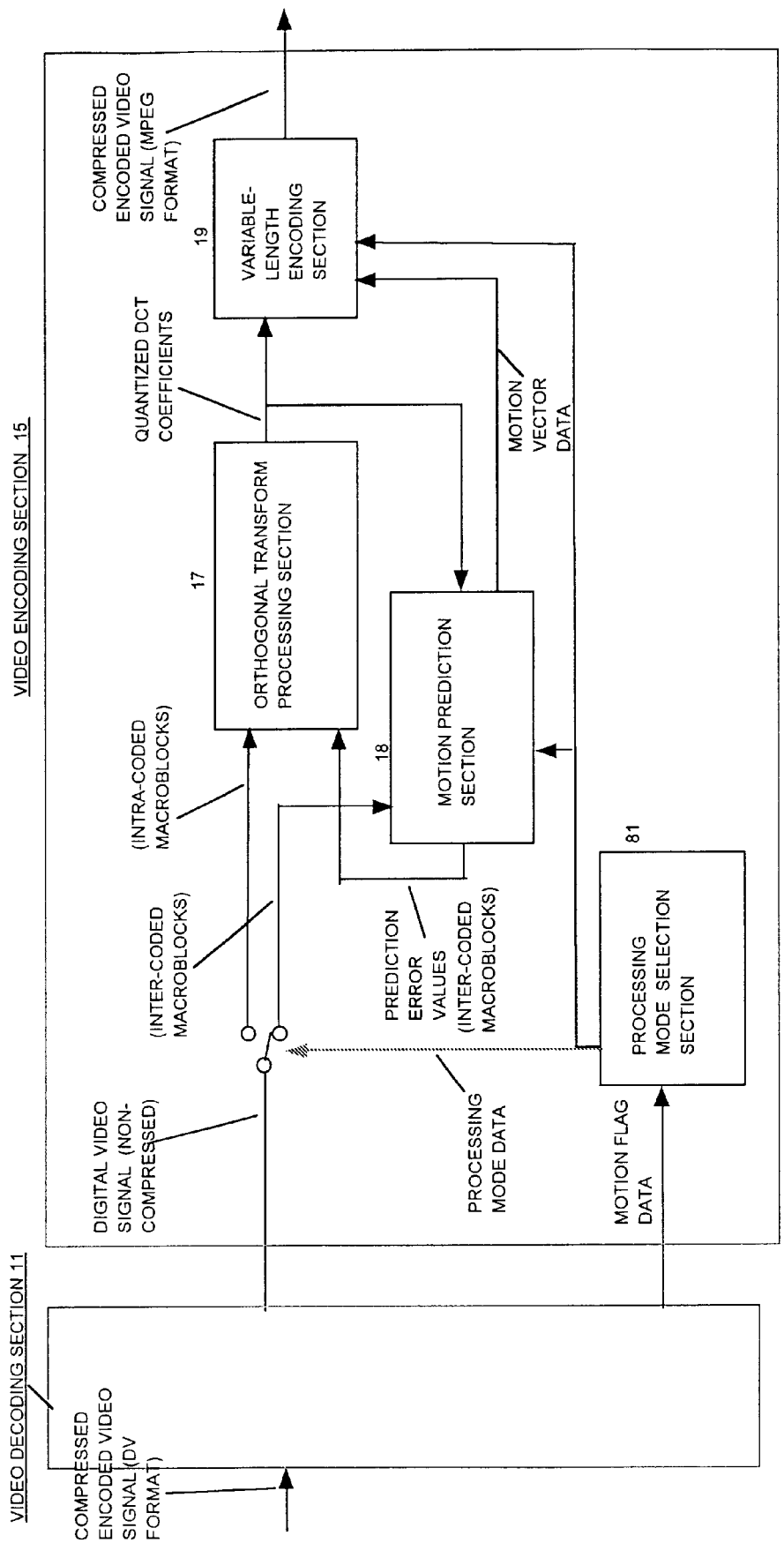
FIG. 11 is a general system block diagram of a fifth embodiment of a video signal conversion apparatus according to the present invention, whereby respective macroblocks of a non-compressed video signal are adaptively selected to be subjected to either intra-coding or inter-coding processing in accordance with a degree of motion which is judged for each macroblock, based on motion flag data.

A fifth embodiment of a video signal conversion apparatus according to the present invention will be described referring to the general system block diagram of FIG. 11. Here, a video decoding section 11 derives a non-compressed video signal and motion flag data from a DV format encoded video signal, as described hereinabove, and supplies these to a video encoding section 15 to derive an MPEG format compressed video signal. In addition to an orthogonal transform processing section 17, a motion prediction section 18 and a variable-length encoding section 19, the video encoding section 15 of this embodiment includes a processing mode selection section 81 which receives the motion flag data from the video decoding section 11, and generates resultant processing mode data for each of respective macroblocks of the non-compressed video signal. With this embodiment, the processing mode data derived for a macroblock is applied to adaptively select whether that macroblock is to be subjected to intra-coding, i.e. direct conversion to sets of quantized DCT coefficients by the orthogonal transform processing section 17 followed by variable-length encoding, or to inter-coding, i.e., motion prediction processing by the motion prediction section 18 to obtain a corresponding set of prediction error values and motion vector, followed by conversion of the prediction error values to quantized DCT coefficients by the orthogonal transform processing section 17 and variable-length encoding, as described hereinabove.

That is to say, if the processing mode selection section 81 judges from the states of the set of motion flags corresponding to an object macroblock that there is a relatively large amount of motion of that macroblock then the processing mode selection section 81 executes control whereby that macroblock is subjected to intra-coding, whereas if there is substantially no motion then the processing mode selection section 81 executes control whereby that macroblock is subjected to inter-coding. Any of the various possible standards described hereinabove for determining the processing mode data for a macroblock based on the states of the set of motion flags corresponding to that macroblock could be utilized with this embodiment, so that for example the processing mode selection section 81 could use a standard whereby it is judged that intra-coding is to be selected for a macroblock if at least one of the motion flags of that macroblock is in the "1" state, or if at least two of the motion flags of the macroblock are in the "1" state, etc.

This embodiment provides the following advantages. Firstly, since selection of macroblocks to be inter-coded or intra-coded is performed adaptively, based on the states of the motion flags, it is not necessary to execute any additional processing for performing such selection of inter-coding and intra-coding, so that the overall amount of processing required for MPEG encoding is reduced. Secondly, since inter-coding is applied only to those macroblocks which do not have a large amount of motion, the search range that is used for motion prediction can be made smaller than is possible with a prior art type of MPEG encoding apparatus. Hence, the amount of processing required to perform motion prediction can be substantially reduced, by comparison with the prior art.

This embodiment is applicable to both MPEG-1 and MPEG-2 encoding.

It will be understood from the above description that, although the features of the present invention have been described based on respectively separate embodiments, various combinations of these features could advantageously be combined into a single video signal conversion apparatus, so that the scope of the invention is not limited to the described embodiments.

What is claimed is:

1. A video signal conversion apparatus for converting DV (Digital Video) encoded video data to MPEG (Motion Picture Expert Group) encoded video data, said DV data consisting of digital video data which have been encoded in a DV format and including motion flag data which specify for each of respective video data blocks whether interlaced-field mode DCT (Discrete Cosine Transform) processing or progressive-field DCT processing has been applied in encoding that block, the apparatus comprising:

video decoding means (11) for decoding said DV encoded video data and for extracting said motion flag data from said DV encoded video data to obtain decoded video data formed of a stream of interlaced-field frames, and video encoding means (15) coupled to receive said decoded video data and said motion flag data, for executing MPEG format encoding of said decoded video data, wherein said video encoding means (15) includes processing mode selection means responsive to said motion flag data for adaptively selecting a mode of said MPEG format encoding, based upon said motion flag data.

2. The video signal conversion apparatus according to claim 1, wherein said video encoding means (15) includes DCT (Discrete Cosine Transform) processing means and said processing mode selection means comprises means for selectively designating progressive-field mode DCT processing by said DCT processing means for a macroblock extracted from a frame of said decoded video data when it is judged from said motion flag data that said macroblock exhibits a relatively large amount of motion and designating interlaced-field mode DCT processing for said macroblock when it is judged from said motion flag data that said macroblock exhibits a relatively small amount of motion.

3. The video signal conversion apparatus according to claim 2, wherein said processing mode selection means comprises:

macroblock extraction means 21 coupled to receive said decoded video data, for extracting successive macroblocks from each of said frames, interlaced-field mode DCT block extraction means (23) for receiving and directly outputting each macroblock which is extracted by said macroblock extraction means 21, progressive-field mode DCT block extraction means (24) for receiving each macroblock which is extracted by said macroblock extraction means 21, separating each of said macroblocks into two half-macroblocks which are contained in a first field and in a second field of each of said frames respectively, and successively outputting said half-macroblocks, and conversion mode control means (22) controlled by said processing mode selection means for selecting each of said macroblocks of said decoded video data to be transferred directly by said interlaced-field mode DCT block extraction means (23) to said DCT processing means (25) for application of interlaced-field mode DCT processing when it is judged from said motion flag data that said macroblock exhibits a relatively small amount of motion, or to be transferred as successive halfblocks from said progressive-field mode DCT block extraction means (24) to said DCT processing means (25) for application of progressive-field mode DCT processing, when it is judged from said motion flag data that said macroblock exhibits a relatively large amount of motion.

4. The video signal conversion apparatus according to claim 1, wherein said video encoding means (15) includes motion prediction processing means (18) and said processing mode selection means comprises means for selectively applying progressive-field mode motion prediction processing by said motion prediction means to a macroblock extracted from a frame of said decoded video data when it is judged from said motion flag data that said macroblock exhibits a relatively large amount of motion and for applying interlaced-field mode motion prediction processing to said macroblock when it is judged from said motion flag data that said macroblock exhibits a relatively small amount of motion.

5. The video signal conversion apparatus according to claim 4, wherein said video encoding means (15) includes video memory means (148) for storing reconstructed video data frames which have been reconstructed from encoded video data, motion search means (43) and prediction error derivation means (44), and wherein said processing mode selection means comprises;

interlaced field mode referenced macroblock extraction means (140) for obtaining from said video memory means a reconstructed frame for use as a reference frame, and outputting successive reference macroblocks from said reference frame, progressive-field mode reference macroblock extraction means (141) for obtaining from said video memory means a reconstructed frame for use as a reference frame, and for separating said frame into first and second fields as first and second reference pictures, and sequentially outputting successive reference macroblocks extracted from said first field, then successive reference macroblocks extracted from said second field, interlaced-field mode object macroblock extraction means (143) for directly extracting successive macroblocks from a frame of said decoded video data, and for outputting said directly extracted successive macroblocks, progressive-field mode object macroblock extraction means (144) for extracting successive macroblocks from a frame of said decoded video data, and for separating each of said macroblocks into a first half-macroblock which is contained in a first field of said frame and a second half-macroblock which is contained in a second field of said frame, and for successively outputting said first and second half-macroblocks, and processing mode control means (16, 42) for selecting reference macroblocks produced from said interlaced-field mode reference macroblock extraction means (140) and a directly extracted macroblock which is produced from said interlaced-field mode object macroblock extraction means (143), to be supplied to said motion search means (43) and said prediction error derivation means (44) for applying interlaced-field mode motion prediction processing to said macroblock, when it is judged from said motion flag data that said macroblock exhibits a relatively small amount of motion, and for selecting reference macroblocks produced from said progressive-field mode reference macroblock extraction means (141) and a successive pair of halfblocks of an extracted macroblock which are produced from said progressive field mode object macroblock extraction means (144), to be supplied to said motion search means (43) and said prediction error derivation means (44) for applying motion prediction processing to said macroblock, when it is judged from said motion flag 15 data that said macroblock exhibits a relatively large amount of motion.

6. The video signal conversion apparatus according to claim 1, wherein said mode selection means selects, for each of successive frames of said decoded video data, interlaced-field mode DCT processing and motion prediction processing when it is judged from said motion flag data that the image contents of a frame exhibit a large amount of motion and progressive-field mode DCT processing and motion prediction processing when it is motion judged from said motion flag data that the image contents of said frame exhibit a small amount of motion.

7. The video signal conversion apparatus according to claim 6, wherein said mode selection means comprises picture formation means (51) coupled to receive said decoded video data and controlled by said processing mode selection means (52) for outputting each interlaced-field frame of said decoded video data unchanged, to be subjected to interlaced-field mode DCT processing and motion prediction processing, when it is judged from said motion flag data that said interlaced-field frame exhibits a small amount of motion and for outputting said each interlaced-field frame as two consecutive fields, to be subjected to progressive-field mode DCT processing and motion prediction processing, when it is judged from said motion flag data that said interlaced-field frame exhibits a relatively large amount of motion.

8. The video signal conversion apparatus according to claim 1, wherein said video encoding means (15) includes motion prediction processing means (18) comprising motion search means (343) for comparing a macroblock extracted from a frame of said decoded video data with successive macroblocks of a reference frame within a specific search range in said reference frame, and wherein s aid processing mode selection means comprises search range control means (61) for operating on said motion search means to set said search range as a narrow range when it is judged from said motion flag data that said macroblock exhibits a relatively small amount of motion and to set said search range as a wide range when it is judged from said motion flag data that said macroblock exhibits a relatively large amount of motion.

9. The video signal conversion apparatus according to claim 1, wherein said video encoding means (15) includes means for applying intra-coding and means for applying inter-coding to respective video data macroblocks, and wherein said processing mode selection means comprises means (81) for transferring a macroblock of an interlaced-field frame of said decoded video data to be subjected to said intra-coding when it is judged from said motion flag data that said macroblock exhibits a relatively large amount of motion, and for transferring said macroblock to be subjected to said inter-coding when it is judged from said motion flag data that said macroblock exhibits a relatively small amount of motion.

10. The video signal conversion apparatus according to claim 1, wherein said processing mode selection means judges whether a macroblock exhibits a large or a small degree of motion based upon the states of respective motion flags of luminance signal blocks of said macroblock.

11. The video signal conversion apparatus according to claim 1, wherein said processing mode selection means judges that a macroblock exhibits a large amount of motion when at least a predetermined number of respective motion flags of luminance signal blocks of said macroblock each indicate a condition of large amount of motion.

12. The video signal conversion apparatus according to claim 1, wherein said processing mode selection means judges that a macroblock exhibits a small amount of motion when at least one of respective motion flags of two color difference signal blocks in said macroblock indicates a condition of small amount of motion.

13. The video signal conversion apparatus according to claim 1, wherein said processing mode selection means judges that a macroblock exhibits a large amount of motion when at least a predetermined number of respective motion flags of four luminance signal blocks of said macroblock and also at least one of respective motion flags of two color difference signal blocks of said macroblock each indicates a condition of large amount of motion.

14. A method of converting DV (Digital Video) encoded video data to MPEG (Motion Picture Expert Group) encoded video data, said DV data consisting of digital video data which have been encoded in a DV format and including motion flag data which specify for each of respective video data blocks a DCT processing mode which has been applied in DV encoding of a block, whether interlaced-field mode DCT (Discrete Cosine Transform) processing or progressive-field DCT processing has been applied in encoding that block, the method comprising:
 decoding said DV encoded video data to obtain decoded video data formed of a stream of interlaced field frames, and extracting said motion flag data from said DV encoded video data, and
 executing MPEG format encoding of said decoded video data, by adaptively selecting a mode of said MPEG format encoding, based upon a judgement of said motion flag data.

15. The video signal conversion method according to claim 14, comprising selecting progressive-field mode DCT (Discrete Cosine Transform) processing to be applied to a macroblock extracted from a frame of said decoded video data when it is judged from said motion flag data that said macroblock exhibits a relatively large amount of motion and selecting interlaced-field mode DCT processing to be applied to said macroblock when it is judged from said motion flag data that said macroblock exhibits a relatively small amount of motion.

16. The video signal conversion method according to claim 14, comprising selecting progressive-field mode motion prediction processing to be applied to a macroblock extracted from a frame of said decoded video data when it is judged from said motion flag data that said macroblock exhibits a relatively large amount of motion and selecting interlaced-field mode motion prediction processing to be applied to said macroblock when it is judged from said motion flag data that said macroblock exhibits a relatively small amount of motion.

17. The video signal conversion method according to claim 14 comprising, for each of successive frames of said decoded video data, selecting interlaced-field mode DCT processing and motion prediction processing to be applied to a frame when it is judged from said motion flag data that the image contents of said frame exhibit a large amount of motion and selecting progressive-field mode DCT processing and motion prediction processing to be applied to said frame when it is judged from said motion flag data that the image contents of said frame exhibit a small amount of motion.

18. The video signal conversion method according to claim 14, comprising selecting a narrow search range for applying motion prediction processing to a macroblock extracted from a frame of said decoded video data when it is judged from said motion flag data that said macroblock exhibits a relatively small amount of motion and to set said search range as a wide range when it is judged from said motion flag data that said macroblock exhibits a relatively large amount of motion.

19. The video signal conversion apparatus according to claim 14, comprising transferring a macroblock of an interlaced-field frame of said decoded video data to be subjected to intra-coding when it is judged from said motion flag data that said macroblock exhibits a relatively large amount of motion, and for transferring said macroblock to be subjected to inter-coding when it is judged from said motion flag data that said macroblock exhibits a relatively small amount of motion.

20. The video signal conversion method according to claim 14, wherein said judgement is executed to determine whether a macroblock of said decoded video data exhibits a large or a small degree of motion, and wherein it is judged that said macroblock exhibits a large amount of motion when at least a predetermined number of respective motion flags of four luminance signal blocks of said macroblock each indicate a condition of large amount of motion.

21. The video signal conversion method according to claim 14, wherein said judgement is excuted to determine whether a macroblock of said decoded video data exhibits a large or a small degree of motion, and wherein it is judged that said macroblock exhibits a small amount of motion when at least one of respective motion flags of two color difference signal blocks in said macroblock indicates a condition of small amount of motion.

22. The video signal conversion method according to claim 14, wherein said judgement is excuted to determine whether a macroblock of said decoded video data exhibits a large or a small degree of motion, and wherein it is judged that said macroblock exhibits a large amount of motion when at least a predetermined number of respective motion flags of four luminance signal blocks of said macroblock and also at least one of respective motion flags of two color difference signal blocks of said macroblock each indicates a condition of large amount of motion.

* * * * *

UNITED STATES PATENT AND TRADEMARK OFFICE
CERTIFICATE OF CORRECTION

PATENT NO. : 6,421,385 B1
APPLICATION NO. : 09/164334
DATED : July 16, 2002
INVENTOR(S) : Tsutomu Uenoyama et al.

It is certified that error appears in the above-identified patent and that said Letters Patent is hereby corrected as shown below:

On Title Page, item 74
Page 1 ATTORNEY, AGENT OR FIRM
Change "Loew" to --Lowe--

Column 23, line 45 change ";" to --:--

Column 23, line 46 change "referenced" to --reference--

Signed and Sealed this

Twenty-fifth Day of December, 2007

JON W. DUDAS
*Director of the United States Patent and Trademark Office*